US010767679B2

(12) United States Patent
Balsells

(10) Patent No.: US 10,767,679 B2
(45) Date of Patent: *Sep. 8, 2020

(54) SPRING LATCHING CONNECTORS

(71) Applicant: BAL SEAL ENGINEERING, LLC, Foothill Ranch, CA (US)

(72) Inventor: Peter J. Balsells, Newport Beach, CA (US)

(73) Assignee: Bal Seal Engineering, LLC, Foothill Ranch, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/066,244

(22) Filed: Oct. 29, 2013

(65) Prior Publication Data

US 2014/0161514 A1 Jun. 12, 2014

Related U.S. Application Data

(63) Continuation of application No. 13/843,018, filed on Mar. 15, 2013, now Pat. No. 9,534,625, which is a (Continued)

(51) Int. Cl.
*F16F 1/06* (2006.01)
*F16B 21/18* (2006.01)
(Continued)

(52) U.S. Cl.
CPC .............. *F16B 21/18* (2013.01); *F16F 1/045* (2013.01); *F16L 37/22* (2013.01); *F16F 1/12* (2013.01);
(Continued)

(58) Field of Classification Search
CPC ... F16F 1/045; F16F 1/12; F16F 1/127; F16B 21/18; F16B 21/186; F16L 37/22
(Continued)

(56) References Cited

U.S. PATENT DOCUMENTS 2,538,683 A 1/1951 Guiler
2,797,937 A 7/1957 Frishof
(Continued)

FOREIGN PATENT DOCUMENTS

DE 19807663 9/1999
GB 2194298 3/1988
(Continued)

OTHER PUBLICATIONS

Office Action mailed Mar. 18, 2011 from corresponding U.S. Appl. No. 12/614,860.
(Continued)

*Primary Examiner* — Melody M Burch
(74) *Attorney, Agent, or Firm* — Klein, O'Neill & Singh, LLP

(57) ABSTRACT

A spring latching connector includes a housing having a bore therethrough, a piston slidably received in said bore, a circular groove formed in one of said bore and piston and a circular coil spring disposed in said groove for latching said piston and housing together. The groove is sized and shaped for controlling, in combination with a spring configuration, disconnect and connect forces of the spring latching connection.

33 Claims, 14 Drawing Sheets

Related U.S. Application Data continuation of application No. 12/614,769, filed on Nov. 9, 2009, now Pat. No. 9,267,526, which is a continuation-in-part of application No. 10/860,199, filed on Jun. 2, 2004, now Pat. No. 8,167,285.

(60) Provisional application No. 60/476,105, filed on Jun. 4, 2003.

(51) Int. Cl.
*F16F 1/04* (2006.01)
*F16L 37/22* (2006.01)
*F16F 1/12* (2006.01)

(52) U.S. Cl.
CPC ...... *Y10T 29/49817* (2015.01); *Y10T 403/602* (2015.01); *Y10T 403/7075* (2015.01)

(58) Field of Classification Search
USPC ......... 267/1.5, 166, 167; 403/326, 345, 357; 277/382, 383; 285/305, 318, 321
See application file for complete search history.

(56) References Cited

U.S. PATENT DOCUMENTS

| | | |
|---|---|---|
| 3,087,038 A | 4/1963 | Bethke |
| 3,105,556 A | 10/1963 | Raulins |
| 3,174,500 A | 3/1965 | Johnson et al. |
| 4,529,257 A | 7/1985 | Goodman et al. |
| 4,632,434 A | 12/1986 | Proctor et al. |
| 4,655,462 A | 4/1987 | Balsells |
| 4,678,210 A | 7/1987 | Balsells |
| 4,763,683 A | 8/1988 | Carmack |
| 4,804,290 A | 2/1989 | Balsells |
| 4,805,943 A | 2/1989 | Balsells |
| 4,872,710 A | 10/1989 | Konecny et al. |
| 4,876,781 A | 10/1989 | Balsells |
| 4,893,795 A | 1/1990 | Balsells |
| 4,905,733 A | 3/1990 | Carow |
| 4,906,031 A | 3/1990 | Vyse |
| 4,974,821 A | 12/1990 | Balsells |
| 5,082,390 A | 1/1992 | Balsells |
| 5,091,606 A | 2/1992 | Balsells |
| 5,108,078 A | 4/1992 | Balsells |
| 5,115,836 A | 5/1992 | Carow et al. |
| 5,134,244 A | 7/1992 | Balsells |
| 5,139,243 A | 8/1992 | Balsells |
| 5,139,276 A | 8/1992 | Balsells |
| 5,141,037 A | 8/1992 | Carmack et al. |
| 5,161,806 A | 11/1992 | Balsells |
| 5,255,723 A | 10/1993 | Carmack et al. |
| 5,265,890 A * | 11/1993 | Balsells ........................ 277/467 |
| 5,375,643 A | 12/1994 | Rude |
| 5,411,348 A | 5/1995 | Balsells |
| 5,433,247 A | 7/1995 | Guertin |
| 5,545,842 A | 8/1996 | Balsells |
| 5,570,719 A | 11/1996 | Richards et al. |
| 5,607,006 A | 3/1997 | Koch |
| 5,615,870 A | 4/1997 | Balsells |
| 5,709,371 A | 1/1998 | Balsells |
| 5,727,821 A * | 3/1998 | Miller ........................... 285/318 |
| 5,791,638 A | 8/1998 | Balsells |
| 6,520,222 B2 | 2/2003 | Carmack et al. |
| 6,672,565 B2 | 1/2004 | Russell |
| 6,749,358 B2 | 6/2004 | Balsells |
| 6,835,084 B2 | 12/2004 | Poon et al. |
| 7,075,455 B2 | 7/2006 | Nishimura et al. |
| 7,195,523 B2 | 3/2007 | Naviaux |
| 7,538,289 B2 | 5/2009 | Carroll |
| 7,722,415 B2 | 5/2010 | Changsrivong |
| 7,914,315 B2 | 3/2011 | Kuhn et al. |
| 7,914,351 B2 | 3/2011 | Balsells et al. |
| 8,052,459 B2 | 11/2011 | Smith et al. |
| 8,096,842 B2 | 1/2012 | Poon et al. |
| 8,166,623 B2 | 5/2012 | Balsells |
| 8,167,285 B2 * | 5/2012 | Balsells ........................ 267/166 |
| 8,297,662 B2 | 10/2012 | Balsells |
| 8,308,167 B2 | 11/2012 | Balsells et al. |
| 8,375,543 B1 | 2/2013 | Balsells |
| 8,382,532 B2 | 2/2013 | Sjostedt et al. |
| 8,491,346 B2 | 7/2013 | Sjostedt et al. |
| 8,561,274 B2 | 10/2013 | Balsells |
| 9,004,805 B2 | 4/2015 | Changsrivong et al. |
| 9,267,526 B2 | 2/2016 | Balsells |
| 9,284,970 B2 | 3/2016 | Dilmaghanian et al. |
| 9,312,630 B2 | 4/2016 | Huang |
| 9,482,255 B2 | 11/2016 | Changsrivong et al. |
| 9,500,211 B2 | 11/2016 | Changsrivong |
| 9,534,625 B2 | 1/2017 | Balsells |
| 9,677,587 B2 | 6/2017 | Changsrivong et al. |
| 2002/0122690 A1 | 9/2002 | Poon et al. |
| 2003/0096526 A1 | 5/2003 | Balsells |
| 2003/0157846 A1 | 8/2003 | Poon et al. |
| 2004/0245686 A1 | 12/2004 | Balsells |
| 2006/0228166 A1 | 10/2006 | Balsells |
| 2010/0279558 A1 | 11/2010 | Leon et al. |
| 2013/0149031 A1 | 6/2013 | Changsrivong et al. |
| 2014/0130329 A1 | 5/2014 | Changsrivong et al. |
| 2014/0162487 A1 | 6/2014 | Frederick et al. |
| 2014/0378008 A1 | 12/2014 | Young et al. |
| 2016/0076568 A1 | 3/2016 | Dilmaghanian et al. |
| 2016/0204557 A1 | 7/2016 | Kim |
| 2016/0265574 A1 | 9/2016 | Ghasiri |
| 2017/0352984 A1 | 12/2017 | Changsrivong et al. |
| 2017/0373425 A1 | 12/2017 | Rust |

FOREIGN PATENT DOCUMENTS

| | | |
|---|---|---|
| JP | 60113908 A | 6/1985 |
| WO | WO 03067713 | 8/2003 |

OTHER PUBLICATIONS

Final Office Action mailed Jul. 25, 2011 from corresponding U.S. Appl. No. 12/614,860.
Office Action mailed Jan. 5, 2012 from corresponding U.S. Appl. No. 12/614,860.
Final Office Action mailed Apr. 11, 2012 from corresponding U.S. Appl. No. 12/614,860.
Office Action mailed Jul. 21, 2012 from corresponding U.S. Appl. No. 12/614,860.
Final Office Action mailed Nov. 13, 2012 from corresponding U.S. Appl. No. 12/614,860.
Non-Final Office Action on co-pending U.S. Appl. No. 10/860,199 dated Jan. 14, 2005.
Non-Final Office Action on co-pending U.S. Appl. No. 13/843,018 dated Jan. 17, 2014.
Non-Final Office Action on co-pending U.S. Appl. No. 13/843,018 dated Oct. 1, 2014.
Non-Final Office Action on related U.S. Appl. No. (U.S. Appl. No. 12/614,769) dated Jun. 12, 2014.
Office Action on corresponding foreign application (EP Application No. 04753994.5) from the European Patent Office dated Apr. 2, 2014.
Non-Final Office Action on co-pending U.S. Appl. No. (U.S. Appl. No. 15/653,304) dated Oct. 18, 2018.
Latching and Holding With Bal Seal Canted-Coil Circular Welding Springs, Product News #164D, Nov. 23, 1991, Bal Seal Engineering Company, Inc., Santa Ana, California, U.S.A., (6 pages).
Bal Seal Canted Coil Springs, Circular and Spring Lengths for Radial and Axial Loading, Calatog No. DM3Mm, Rev. A, Jul. 17, 1992, Bal Seal Engineering Company, Inc., Santa Ana, CA, U.S.A., (24 pages).
Bal Seal Engineering, Bal Shield Solutions for EMI Applications, EMI Gasket Catalog DM8, Bal Seal Engineering Company, Inc., 2001, (14 pages).
Bal Seal Engineering, Bal-Springs for Holding, Latching, Locking, and Compressing Applications, Bal-Spring Catalog DM-9, Bal Seal Engineering Company, Inc., 2003, U.S.A. (21 pages).

(56) References Cited

OTHER PUBLICATIONS

Non-Final Office Action on co-pending U.S. Appl. No. (U.S. Appl. No. 16/109,479) dated Aug. 6, 2019.

* cited by examiner

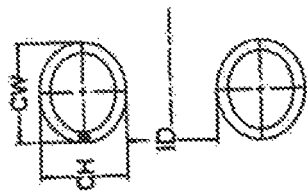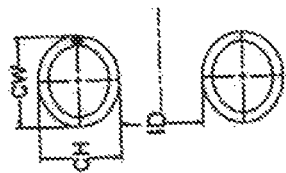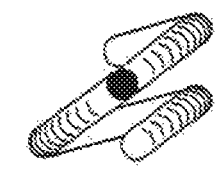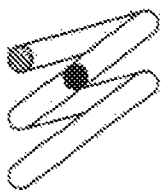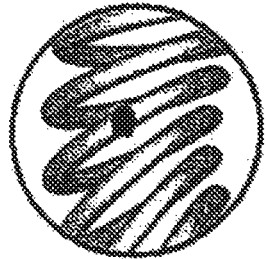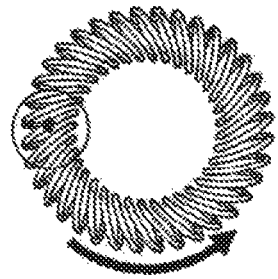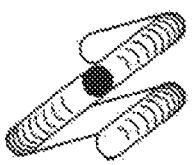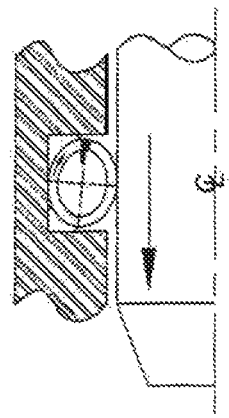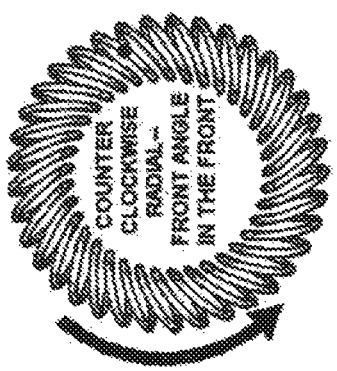

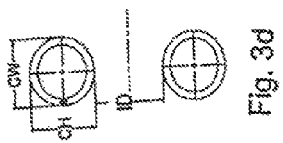
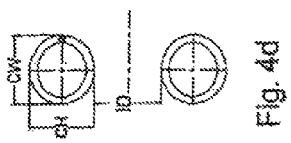
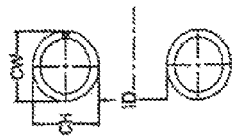
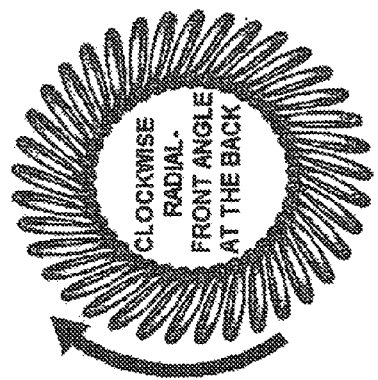
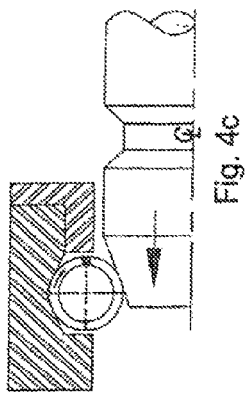
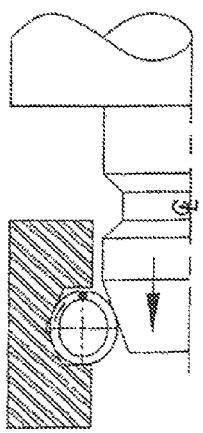
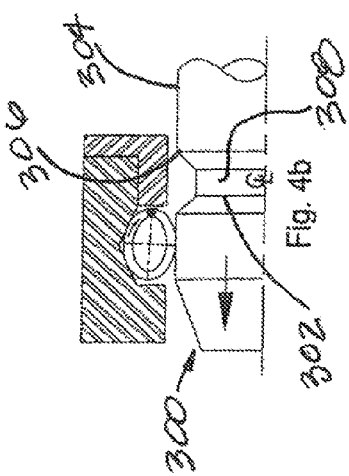
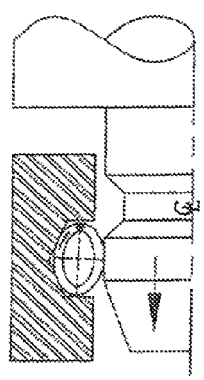
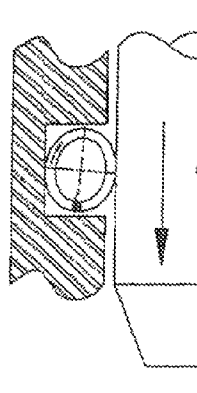
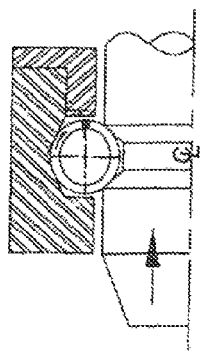
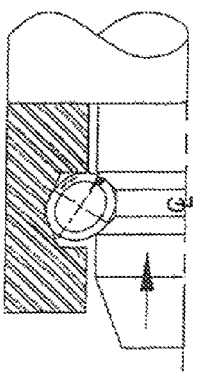

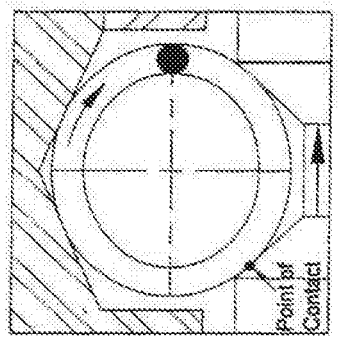 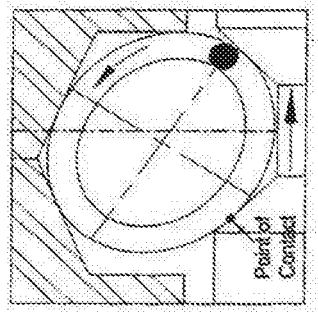

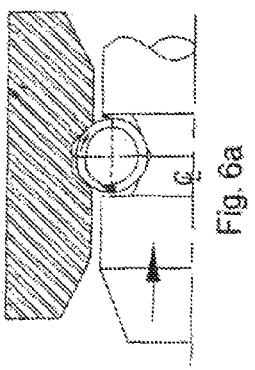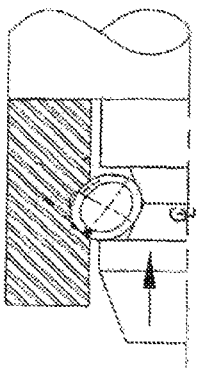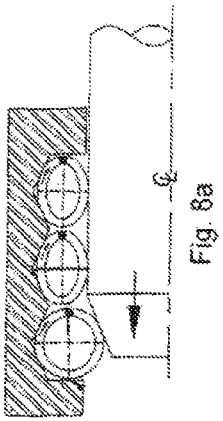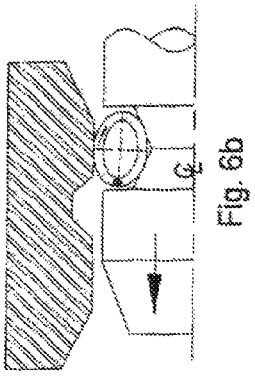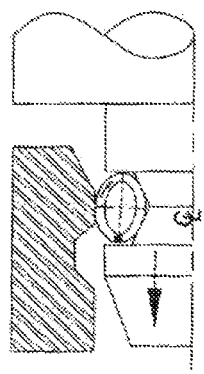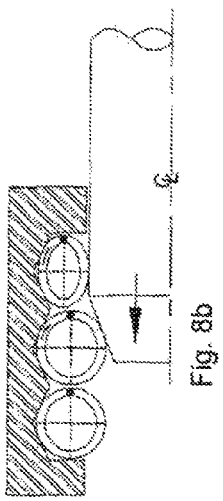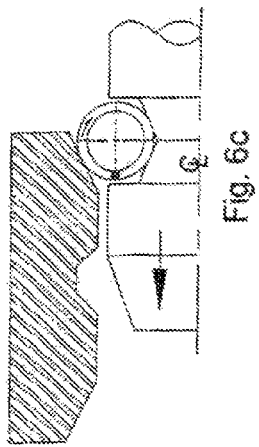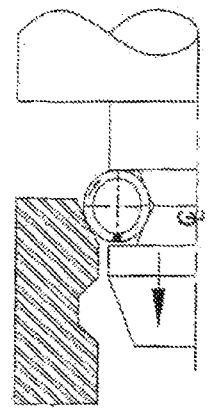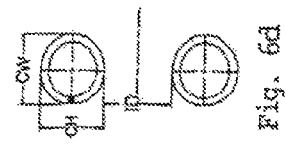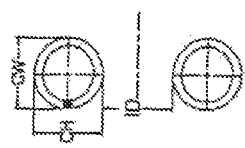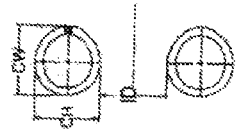

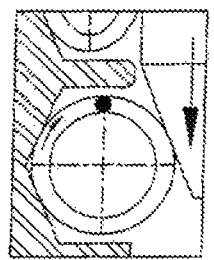
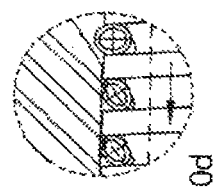
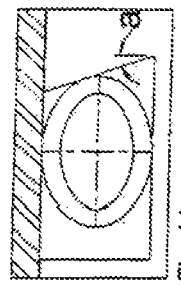
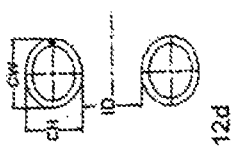
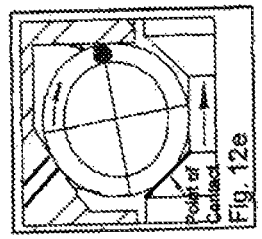
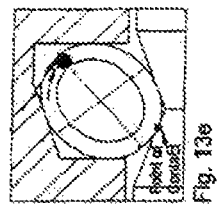
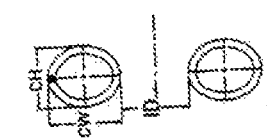
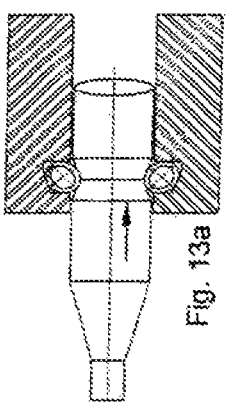
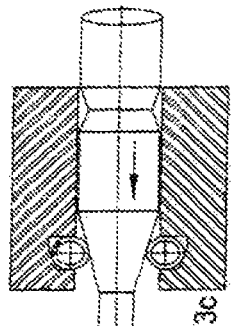

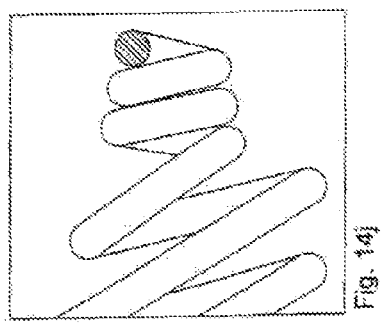
Fig. 14j
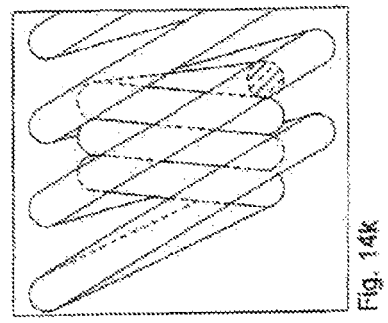
Fig. 14k
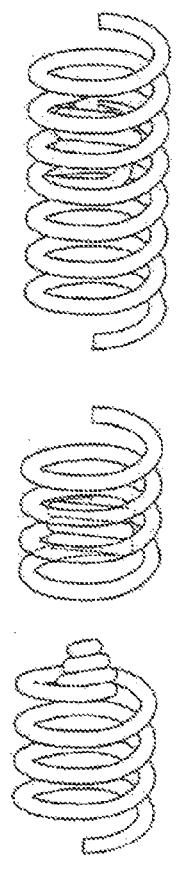
Fig. 14a
Fig. 14b
Fig. 14c
Fig. 14d
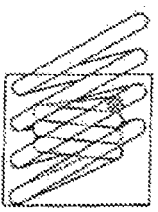
Fig. 14e
Fig. 14f
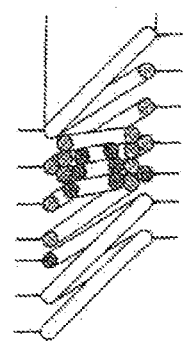
Fig. 14g
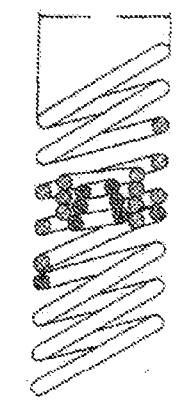
Fig. 14h
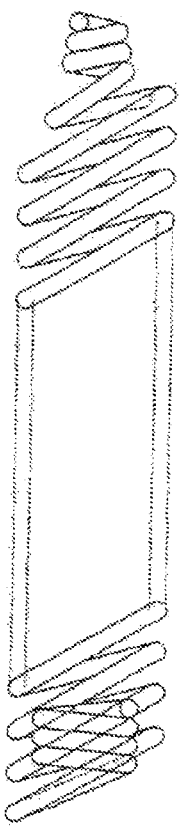
Fig. 14i

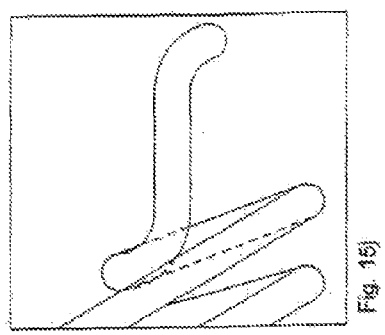
Fig. 15j
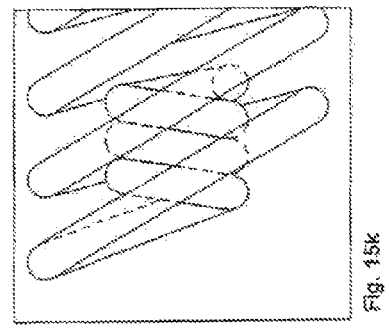
Fig. 15k
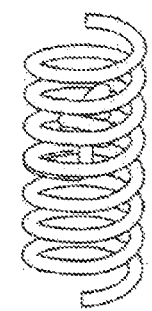
Fig. 15b
Fig. 15c
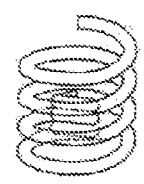
Fig. 15e
Fig. 15f
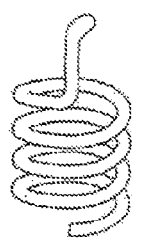
Fig. 15a
Fig. 15d
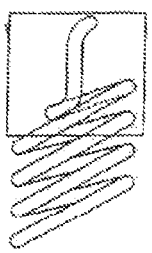
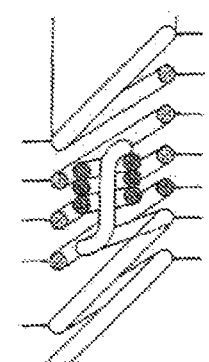
Fig. 15h
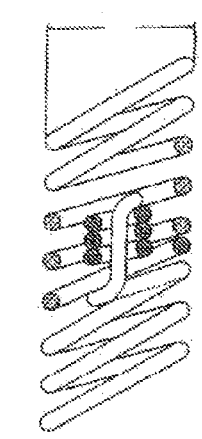
Fig. 15g
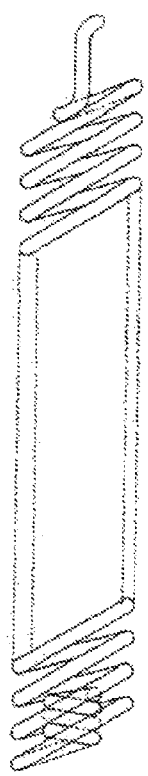
Fig. 15i

SPRING LATCHING CONNECTORS

CROSS-REFERENCE TO RELATED APPLICATIONS

This application is a continuation of U.S. application Ser. No. 13/843,018, filed Mar. 15, 2013, which is a continuation of U.S. application Ser. No. 12/614,769, filed Nov. 9, 2009, which is a continuation-in-part of U.S. application Ser. No. 10/860,199 now U.S. Pat. No. 8,167,285, filed Jun. 2, 2004; which is a regular application of Provisional No. 60/476, 105, filed Jun. 4, 2003, the contents of all of which are expressly incorporated herein by reference for all purposes.

FIELD OF ART

The present invention generally relates to connectors and is more directly related to the use of canted coil springs in connecting a piston and a housing for mechanical and electrical connection purposes.

BACKGROUND

The connection may used to hold or latch and disconnect or unlatch. Various types of canted coil springs, such as radial, axial, or turn angle springs may be used depending on the characteristics desired for a particular application.

Axial springs may be RF with coils canting clockwise or F with coils canting counterclockwise, and installed or mounted with a front angle in front or in back relative to a direction of piston travel in an insertion movement. The springs can be mounted in various manners in a groove in either the piston or the housing. While the spring is generally mounted in a round piston or a round housing, the canted coil spring is capable of being utilized in non-circular applications such as elliptical, square, rectangular, or lengthwise grooves.

Various applications require differing force and force ratios for the initial insertion force, the running force, and the force required to latch and disconnect mating parts. The force, the degree of constraint of the spring, the spring design, the materials used, and the ability of the spring and housing combination to apply a scraping motion to remove oxides that may form on mating parts have been found in accordance with the present invention to determine the electrical performance of the connector. Electrical performance means the resistivity and the resistivity variability of the mated parts.

SUMMARY

It has been found that the force to connect and the force to disconnect as well as the ratio between the two is determined by the position of the point of contact relative to the end point of the major axis of the spring when the disconnect or unlatch force is applied and the characteristics of the spring and the spring installation or mounting. The maximum force for a given spring occurs when the point of contact is close to the end point of the major axis of the spring. The minimum force for a given spring occurs when the contact point is at the maximum distance from the end point of the major axis, which is the end point of the minor axis of the spring. This invention deals in part with the manner in which the end point is positioned. The material, spring design, and method of installing the spring determine the spring influenced performance characteristics of the invention.

Accordingly, a spring latching connector in accordance with the present invention generally includes a housing having a bore therethrough along with a piston slidably received in the bore. In one embodiment, the housing bore and piston abut one another in order to eliminate axial play.

A circular groove is formed in one of the bore and the piston and a circular coil spring is disposed in the groove for latching the piston in a housing together.

Specifically, in accordance with the present invention a groove is sized and shaped for controlling, in combination with a spring configuration, the disconnect and connect forces of the spring latching connector.

The circular coil spring preferably includes coils having a major axis and a minor axis and the circular groove includes a cavity for positioning a point of contact in relation to an end of the coil major axis in order to determine the disconnect and the connect forces. More specifically, the groove cavity positions the point of contact proximate the coil major axis in order to maximize the disconnect forces. Alternatively, the groove cavity may be positioned in order that the point of contact is proximate an end of the minor axis in order to minimize the disconnect force.

In addition, the coil height and groove width may be adjusted in accordance with the present invention to control the disconnect and connect forces.

Further, a major axis of the coil spring is disposed above an inside diameter of a housing groove for a housing mounted coil spring and below an outer diameter of a piston groove for a piston-mounted coil spring.

BRIEF DESCRIPTION OF THE DRAWINGS

The present invention may be more clearly understood with reference to the following detailed description in conjunction with the appended drawings of which:

FIG. 1A-shows a front view of a canted coil spring with the coils canting counterclockwise as indicated by the arrow;

FIG. 1B shows and enlarged view of the coils;

FIG. 1C shows the position of the front and back angle;

FIG. 1D shows the difference between the lengths of the front angle and the back angle;

FIG. 1E shows the position of the front and back angles;

FIG. 1F shows a cross sectional view of a radial spring.

FIG. 2A shows a radial spring in a flat bottom-housing groove;

FIG. 2B shows a left side view of the spring;

FIG. 2C shows a front view of a counterclockwise radial spring with a front angle in the front;

FIG. 2D shows a cross sectional view of the spring;

FIGS. 3A-3E show a radial spring mounted clockwise in a flat bottom housing groove with the front angle in the back, the spring having coils canting clockwise;

FIGS. 4A-4E show a latching radial spring in a standard latching groove, housing mounted (shown in FIGS. 4A and 4E);

FIGS. 5A-5E show a radial spring axially loaded with the grooves offset in a latched position with a housing bore and piston abutting one another for eliminating axial play, see FIG. 5A. This enhances conductivity and reduces resistivity variation;

FIGS. 6A-6E and 7A-7E show the same type of design but piston mounted. FIGS. 6A-6E show a latching radial spring in a latching groove, piston mounted, while FIGS. 7A-7E shows a latching radial spring with offset axial grooves for minimal axial play piston mounted. The features are the same as indicated in FIGS. 4A-4E and 5A-5E except piston mounted.

FIG. 7A shows an abutting relationship between a housing bore and piston similar to FIG. 5A;

FIGS. 8A-8D show a series of circular holding multiple radial spring mounted one in each groove. Each spring is separate from the others, FIG. 8B showing one spring being compressed radially by the shaft as it moves in the direction of the arrow, FIG. 8A showing two springs deflected radially in the direction of the arrow, FIG. 8D showing a cross section of the spring. Springs in a multiple manner could also be axial;

FIGS. 9A-9E show a holding multiple radial springs mounted in multiple grooves, this design being similar to the one indicated in FIGS. 8A-8E but the grooves are physically separated from each other, springs in a multiple manner may also be axial;

FIGS. 10A-10D show a holding length spring mounted axially in a threaded groove, FIG. 10B showing the piston partially engaging the housing by deflecting the spring coils, FIG. 10A showing the shaft moving in the direction of the arrow with further compression of the spring coils, FIG. 10C showing a length of the spring and FIG. 10D showing an axial spring mounted in the groove with two spring coils deflected and one not deflected as yet;

FIGS. 11A-11E shows a face compression axial spring retained by inside angular sidewall;

FIGS. 12A-12E show a latching radial spring in a radial groove designed for high disconnect to insertion ratio shown radially loaded and causing the coils to turn to provide axial load to reduce axial movement. GW>CH;

FIGS. 13A-13E show a latching axial spring in an axial groove designed for high disconnect to insertion ratio with the spring shown in an axially loaded position to limit axial play, the spring coils assuming a turn angle position that increases force and provides higher conductivity with reduced variability;

FIGS. 14A-14K show a spring with ends threaded to form a continuous spring-ring without welding joining, which is different than the design indicated in FIG. 1;

FIGS. 15A-15K show a spring with end joined by a male hook and step-down circular female end to form a continuous circular spring-ring without welding;

DETAILED DESCRIPTION

Figure 2E:
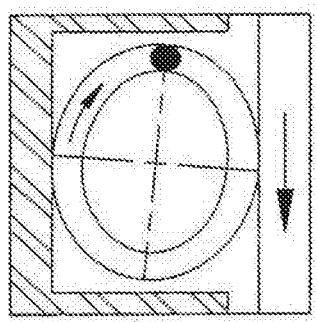
FIG. 2E shows a cross sectional view of the spring mounted in a housing, a reference dot point indicating a position of a front angle of a coil, "the end point of a major axis of the coil" being used to explain the relationship between a point of contact and the end point of the major axis of the coil when determining the unlatching or disconnect force, the dot point showing a position of the front angle of the coil.

Connectors using latching applications have been described extensively, as for example, U.S. Pat. Nos. 4,974, 821, 5,139,276, 5,082,390, 5,545,842, 5,411,348 and others.

Groove configurations have been divided in two types: one type with a spring retained in a housing described in Tables 1 a-1 g and another with the spring retained in a shaft described in Tables 2 a-2 g.

Definitions

A definition of terms utilized in the present application is appropriate.

Definition of a radial canted coil spring. A radial canted coil spring has its compression force perpendicular or radial to the centerline of the arc or ring.

Definition of axial canted coil spring. An axial canted coil spring has its compression force parallel or axial to the centerline of the arc or ring.

The spring can also assume various angular geometries, varying from 0 to 90 degrees and can assume a concave or a convex position in relation to the centerline of the spring.

Definition of concave and convex. For the purpose of this patent application, concave and convex are defined as follows:

The position that a canted coil spring assumes when a radial or axial spring is assembled into a housing and positioned by—passing a piston through the ID so that the ID is forward of the centerline is in a convex position.

When the spring is assembled into the piston, upon passing the piston through a housing, the spring is positioned by the housing so that the OD of the spring is behind the centerline of the spring is in a convex position.

The spring-rings can also be extended for insertion into the groove or compressed into the groove. Extension of the spring consists of making the spring ID larger by stretching or gartering the ID of the spring to assume a new position when assembled into a groove or the spring can also be made larger than the groove cavity diameter and then compressed the groove.

Canted coil springs are available in radial and axial applications. Generally, a radial spring is assembled so that it is loaded radially. An axial spring is generally assembled into a cavity so that the radial force is applied along the major axis of the coil, while the coils are compressed axially and deflect axially along the minor axis of the coil.

Radial springs. Radial springs can have the coils canting counterclockwise (Table 1 a, row 2, column 13) or clockwise (Table 1 a, row 3, column 13). When the coils cant counterclockwise, the front angle is in the front (row 2, column 13). When the coils cant clockwise (Table 1 a, row 3, column 13), the back angle is in the front. Upon inserting a pin or shaft through the inside diameter of the spring with the spring mounted in the housing in a counterclockwise position (Table 1 a, row 2, columns 2, 3, 5), the shaft will come in contact with the front angle of the coil and the force developed during insertion will be less than when compressing the back angle from a spring in a clockwise position. The degree of insertion force will vary depending on various factors. The running force will be about the same (Table 1 a, row 2, columns 6, 8).

RUNNING FORCE. Running force is the frictional force that is produced when a constant diameter portion of the pin is passed through the spring.

Axial springs may also be assembled into a cavity whose groove width is smaller than the coil height (Table 1 a, row 5, columns 2, 3, 5, 6, 7 and 8). Assembly can be done by inserting spring (Table 1 a, row 5, column 13) into the cavity or by taking the radial spring (Table 1 a, row 7, column 13) and turning the spring coils clockwise 90.degree. into a clockwise axial spring (Table 1 a, row 7, column 15) and inserting into the cavity. Under such conditions, the spring will assume an axial position, provided the groove width is smaller than the coil height. Under such conditions, the insertion and running force will be slightly higher than when an axial spring is assembled into the same cavity. The reason is that upon turning the radial spring at assembly, a higher radial force is created, requiring a higher insertion and running force.

Axial springs RF and F definition. Axial springs can be RF (Table 1 a, row 5, column 13) with the coils canting clockwise or they can be F (Table 1 a, row 6, column 13) with the coils canting counterclockwise. An RF spring is defined as one in which the spring ring has the back angle at the ID of the coils (Table 1 a, row 5, column 12) with the front angle on the OD of the coils. An F spring (Table 1 a, row 6, column 13) has the back angle on the OD and the front angle at the ID of the coils.

Turn angle springs are shown in Table 1 e, row 10, column 13, Table 1 f, rows 2-5, column 13. The springs can be made with turn angles between 0 and 90 degrees. This spring can have a concave direction (Table 1 a, row 5, column 6) or a convex direction (Table 1 a, row 5, column 8) when assembled into the cavity, depending on the direction in which the pin is inserted. This will affect the insertion and running force.

F type axial springs always develop higher insertion and running forces than RF springs. The reason is that in an F spring the back angle is always located at the OD of the spring, which produces higher forces.

Definition of Point of Contact. The point of load where the force is applied on the coil during unlatching or disconnecting of the two mating parts. (Table 1 a, row 2, column 11, row 5, column 11).

Definition of "end of the major axis of the coil." The point at the end of the major axis of the coil. (Table 1 a, row 2, column 2 and row 5, column 2).

Types of grooves that may be used.

Flat groove. (Table 1 a, row 2, column 4) The simplest type of groove is one that has a flat groove with the groove width larger than the coil width of the spring. In such case, the force is applied radially.

'V' bottom groove. (Table 1 a, row 4, column 4) This type of groove retains the spring better in the cavity by reducing axial movement and increasing the points of contact. This enhances electrical conductivity and reduces the variability of the conductivity. The groove width is larger than the coil width. The spring force is applied radially.

Grooves for axial springs. (Table 1 a, row 5, column 2) Grooves for axial springs are designed to better retain the spring at assembly. In such cases, the groove width is smaller than the coil height. At assembly, the spring is compressed along the minor axis axially and upon the insertion of a pin or shaft through the ID of the spring the spring, the coils deflect along the minor axis axially.

There are variations of these grooves from a flat bottom groove to a tapered bottom groove.

Axial springs using flat bottom groove. In such cases, the degree of deflection available on the spring is reduced compared to a radial spring, depending on the interference that occurs between the coil height and the groove width.

The greater the interference between the spring coil height and the groove, the higher the force to deflect the coils and the higher the insertion and running forces.

In such cases, the spring is loaded radially upon passing a pin through the ID. The deflection occurs by turning the spring angularly in the direction of movement of the pin. An excessive amount of radial force may cause permanent damage to the spring because the spring coils have "no place to go" and butts.

Axial springs with grooves with a tapered bottom. (Table 1 b, rows 7-9, column 2 through Table 1 c, rows 2-7, column 2) A tapered bottom groove has the advantage that the spring deflects gradually compared to a flat bottom groove. When a pin is passed through the ID of the spring, it will deflect in the direction of motion. The running force depends on the direction of the pin and the type of spring. Lower forces will occur when the pin moves in a concave spring direction (Table 1 b, row 5, column 6) and higher force when the pin moves in a convex spring direction (Table 1 b, row 5, column 8).

Tapered bottom grooves have the advantage that the spring has a substantial degree of deflection, which occurs by compressing the spring radially, thus allowing for a greater degree of tolerance variation while remaining functional as compared to flat bottom grooves.

Mounting of groove. Grooves can be mounted in the piston or in the housing, depending on the application. Piston mounted grooves are described in Tables 2 a-2 g.

Expansion and contracting of springs. A radial spring ring can be expanded from a small inside diameter to a larger inside diameter and can also be compressed from a larger OD to a smaller OD by crowding the OD of the spring into the same cavity. When expanding a spring the back angle and front angles of the spring coils decrease, thus increasing the connecting and running forces. When compressing a radial spring OD into a cavity, which is smaller than the OD of the spring, the coils are deflected radially, causing the back and front angles to increase. The increase of these angles reduces the insertion and running forces when passing a pin through the ID of the spring.

Figure 6E:
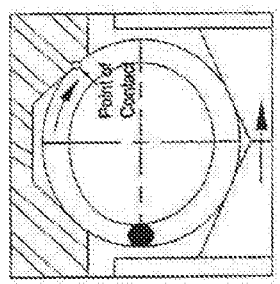

The following patents and patent application are to be incorporated in this patent application as follows: [0073] 1) U.S. Pat. No. 4,893,795 sheet 2 FIGS. 4, 5A, 5B, 5C, 5D, 5E, 6A and 6B; [0074] 2) U.S. Pat. No. 4,876,781 sheet 2 and sheet 3 FIGS. 5A, 5B, and FIG. 6. [0075] 3) U.S. Pat. No. 4,974,821 page 3 FIGS. 8 and 9 [0076] 4) U.S. Pat. No. 5,108,078 sheet 1 FIGS. 1 through 6 [0077] 5) U.S. Pat. No. 5,139,243 page 1 and 2 FIGS. 1A, 1B, 2A, 2B and also FIGS. 4A, 4B, 5A, and 5E [0078] 6) U.S. Pat. No. 5,139,276 sheet 3 FIGS. 10A, 10B, 10C, 11A, 11B, 12A, 12B, 12C, 13A, 13B, and 14 [0079] 7) U.S. Pat. No. 5,082,390 sheet 2 and 3, FIGS. 4A, 4B, 5A, 5B, 6A, 6B, 7A, 7C, 8A, 8B [0080] 8) U.S. Pat. No. 5,091,606 sheets 11, 12, and 14. FIGS. 42, 43, 44, 45, 46, 47, 48, 48A, 48B, 49, 50A, 50B, 50C, 51A, 51B, 51C, 58A, 58B, 58C, 58D. [0081] 9) U.S. Pat. No. 5,545,842 sheets 1, 2, 3, and 5. FIGS. 1, 4, 6, 9, 13, 14, 19, 26A, 26B, 27A, 27B, 28A, 28B. [0082] 10) U.S. Pat. No. 5,411,348 sheets 2, 3, 4, 5, and 6. FIGS. 5A, 5C, 6A, 6C, 7A, 7C, 7D, 8A, 8B, 8C, 9A, 9C, 10C, 11, 12 and 17. [0083] 11) U.S. Pat. No. 5,615,870 Sheets 1-15, Sheets 17-23 with FIGS. 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 66, 67, 68, 69, 70, 71, 72, 73, 74, 75, 76, 77, 78, 79, 80, 81, 82, 83, 84, 85, 86, 87, 88, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 123, 124, 125, 126, 127, 128, 129, 130, 131, 132, 133, 134, 135. [0084] 12) U.S. Pat. No. 5,791,638 Sheets 1, 2, 3, 4, 5, 6, 7, 8, 9, 10, 11, 12, 13, 14, 15, 17, 18, 19, 20, 21, 22, 23. FIGS. 1-61 and 66-88 and 92-135. [0085] 13) U.S. Pat. No. 5,709,371, page 1, 2, 3, 4, 5, 6, 7, 8, 9, 10, 11, 12, 13, 14, 15, 17, 18, 19, 20, 21, 22, 23. FIGS. 1-61 and 66-88 and 92-135. [0086] 14) Application for patent by Balsells entitled "Spring Holding Connectors" Customer Ser. No. 10/777,974 filed Feb. 12, 2004.

In general, Tables 1 a-1 g illustrate housing mounted designs for holding and other applications. These tables show 53 different types of grooves and spring geometries in which the spring is mounted in the housing, using different spring configurations and different groove variations, which result in different insertion and running forces.

Table 1 a, row 2, columns 2-12 show a flat bottom groove with a radial spring.

Table 1 a, row 2, column 2 shows an assembly with a spring mounted in a housing with a shaft moving forward axially.

Table 1 a, row 2, column 3 shows the assembly in a latched position.

Table 1 a, row 2, column 4 shows schematic of a flat bottom groove.

Table 1 a, row 2, column 5 shows and enlarged portion of Table 1A, row 2, column 2.

Table 1 a, row 2, column 6 shows the assembly in a hold running connect direction Table 1 a, row 2, column 7 shows an enlarged portion of Table 1 a, row 2, column 3 in a latch position.

Table 1 a, row 2, column 8 shows the assembly in a hold running disconnect direction.

Table 1 a, row 2, column 9 shows the assembly returning to the inserting position.

Table 1 a, row 2, column 10 shows an enlarged view of the point of contact between the coils and the shaft.

Table 1 a, row 2, column 11 shows an enlarged view of Table 1 a, row 2, column 3.

Table 1 a, row 2, column 12 shows a cross section of the radial spring with the dot indicating the front angle.

Table 1 a, row 2, column 13 shows the spring in a free position and shows a front view of the canted coil counterclockwise radial spring with the front angle in front.

Table 1 a, row 3, columns 2-12 show a spring mounted 180.degree. from that shows in Table 1 a, row 2 in a clockwise position.

Table 1 a, row 4, columns 1-12 show a V-bottom groove with a counterclockwise radial spring.

Table 1 a, row 5, columns 1-12 show a flat bottom axial groove with an RF axial spring. The groove width is smaller than the coil height and the point of contact is closer to the centerline of the major axis of the spring coil. The closer the point of contact is to the point at the end of the major axis of the coil, the higher the force required to disconnect in a convex direction. (Table 1 a, row 5, columns 7-8).

Table 1 a, row 6, columns 2-12 show a flat bottom groove with an F axial spring. The groove width is smaller than the coil height.

Table 1 a, rows 7-8 and Table 1 b, row 9 show a radial spring turned into an axial spring by assembling this spring into a cavity in an axial position.

More specifically, Table 1 a, row 6 shows a flat bottom axial groove with counterclockwise radial spring mounted in an RF axial position. The groove width is smaller than the coil height.

Table 1 a, row 8 is a flat bottom groove with a counterclockwise radial spring mounted in an F axial position.

Table 1 a, row 9 is a flat bottom groove with a clockwise radial spring mounted in an RF axial position. The groove width smaller than the coil height, and Table 1 b, row 2 shows a flat bottom axial groove with clockwise radial spring mounted in F axial position. Groove width smaller than the coil height.

Table 1 b, row 3 shows a V bottom groove with an RF axial spring. The groove width is smaller than the coil height.

Table 1 b, row 4 shows a flat bottom groove with an RF axial spring with a groove width larger than the coil height. Making the groove width larger than the coil heights allows the point of contact to move further away from the point at the end of the major axis of the coil at disconnect thus decreasing the force.

Table 1 b, row 5 shows a V bottom flat groove with RF axial spring. The groove width is larger than the coil height. (GW>CH)

Table 1 b, row 6 shows a design like Table 1 b, row 5, except that the RF axial spring has offset coils that fit into the groove. The offset coils allow partial contact holding within the groove at different intervals along the groove diameter walls, and the coils are deflected axially at different points of the groove on both sides sufficiently to retain the spring in place. The offset coils increase the total axial coil height, which helps retain the spring inside the groove. The insertion and running forces are also reduced compared to Table 1 b, row 5 where the groove width is smaller than the coil height. The difference in force is illustrated in Table 1 b, row 6, column 12, where force versus shaft travel distance is shown illustrating the force developed.

Table 1 b, row 6, column 13 and 14 shows the offset coils in a free position.

Table 1 b, row 6, column 11 shows the point of contact in relation to the point at the end of the major axis of the coils with the point of contact further away from the major axis of the coil thus decreasing the force required to disconnect. This can be compared with Table 1 b, row 8, column 11 whereby the point of contact is closer to the point at the end of the major axis of the coil, thus requiring a substantially higher force to disconnect.

Table 1 b, row 7 shows an axial RF spring with a tapered bottom groove that positions the point of contact (Table 1 b, row 7, column 11) closer to the end point at the end of the major axis of the coil than in Table 1 b, row 6, column 11, thus requiring a greater force to disconnect.

Table 1 b, row 8 shows a tapered bottom groove of a different configuration but similar to Table 1 b, row 7 with an RF axial spring with a groove width smaller than the coil height. The groove configuration positions the point of contact closer to the end point at the end of the major axis of the coil. An axial RF spring is used in this design.

Table 1 b, row 9 shows a tapered bottom groove with RF axial spring with a groove width smaller than the coil height. The point of contact is positioned at the end point of the major axis of the coil and disconnect is not possible as the force is applied along the major axis since the spring will not compress along that axis.

Table 1 c, row 2 shows a tapered bottom groove with an axial spring mounted in the groove. The position of the spring is such that the centerline along the minor axis is slightly above the bore, which results in less deflection of the spring, thus positioning the point of contact further away from the end point of the major axis of the coil, resulting in a lower disconnect force.

Table 1 c, row 3 shows a tapered bottom groove with an axial spring mounted in the groove. The groove is shown with a 25-degree angle. By increasing the angle, the distance from the end of the major axis of the coil to the point of contact increases (Table 1 c, row 3, column 11 compared to Table 1 b, row 8, column 11), resulting in lower connect and disconnect forces.

On the other hand, decreasing the taper angle will bring the point of contact closer to the end of the major axis of the coil, resulting in higher connect and disconnect forces. Increasing the groove angle will increase the spring deflection which will increase the running force.

Table 1 c, row 4 shows a tapered bottom groove with an RF axial spring with the shaft inserted in the opposite direction. The groove width is smaller than the coil height. In this case, again, the point of contact at the point at the end of the major axis of the coil and no deflection exists and a disconnect is not possible.

Insertion force in this direction will cause the spring coil to turn counter clockwise thus applying a force along the major axis of the coil and the spring will not deflect along the major axis causing damage to the spring.

Table 1 c, row 5 shows a tapered bottom groove with 45.degree. turn angle spring with the shaft inserted in the convex direction. The groove width is smaller than the coil width. The angular spring deflects axially.

Table 1 c, row 6 shows a tapered bottom groove with an RF axial spring filled with an elastomer with a hollow center. The groove width is smaller than the coil height (GW<CH).

Table 1 c, row 7 Shows a tapered bottom groove with an RF axial spring filled with an elastomer solid, as in Table 1 c, row 6 with the groove width smaller than the coil height (GW<CH).

Table 1 c, row 8 shows a step round flat bottom groove with an RF axial spring groove with the width smaller than the coil height. This design has a groove with a point of contact that scrapes the wire as the coil moves, removing oxides that may be formed on the surface of the wire. The groove has been designed to provide a lower force at disconnect by increasing the distance between the point of contact and the point at the end of the major axis of the coil.

Table 1 c, row 9 shows an inverted V bottom groove with RF axial spring. The groove width is smaller than the coil height.

Table 1 d, row 2 shows a tapered bottom groove with a counterclockwise radial spring mounted in a RF position. The groove width is smaller than the coil height. Notice the position of the point of contact with respect to the end point at the end of the major axis of the coil. The closer the point of contact to the end point at the end of the major axis of the coil the higher the force required to disconnect.

Table 1 d, row 3 shows a tapered bottom groove with a counterclockwise radial spring mounted in an F axial position. The groove width is smaller than the coil height.

Table 1 d, row 4 shows a tapered bottom groove with a clockwise radial spring mounted in an RF axial position. The groove width is smaller than the coil height.

Table 1 d, row 5 shows a tapered bottom groove with a clockwise radial spring mounted in an F axial position. The groove width is smaller than the coil height.

Table 1 d, row 6 shows a dovetail groove with a counterclockwise radial spring.

Table 1 d, row 7 shows a special groove with a counterclockwise radial spring.

Table 1 d, row 8 shows an angle of zero to 22 1/2 degrees flat and tapered bottom groove with a counterclockwise radial spring. The groove width is greater than the coil width. The spring in latching will turn clockwise positioning the coil to reduce the force required to disconnect by positioning the point of contact further away from the end of the end point at the end of the major axis of the coil.

Table 1 d, row 9 shows an angle of 0 to 22 1/2 degrees. The piston groove has a flat and a tapered bottom with a clockwise spring. The spring has an ID to coil height ratio smaller than 4. Under load, this spring has a higher torsional force that requires a higher force to connect or disconnect the shaft. Upon latching, the spring turns clockwise, moving the point of contact closer to the end of the major axis of the coil (Table 1 d, row 9, column 7 and Table 1 d, row 9, column 11) thus increasing the force to disconnect.

Table 1 e, row 2 is like Table 1 d, row 9 except that in this case, the spring groove has an ID to coil height ratio greater than 4, thus the radial force applied to the spring at connect or disconnect is substantially lower. As the ratio of the ID of the spring to the coil height increases, the force required to connect or disconnect decreases due to a lower radial force.

Figure 3E:
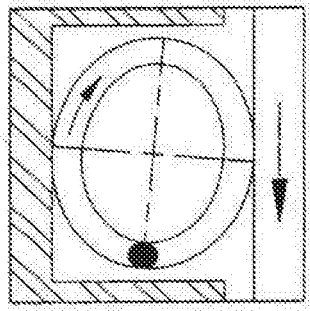

Table 1 e, row 3 has an angle groove with a 0.degree. to 22.5.degree. piston groove angle similar to FIG. 3 except that the piston groove has a 'V' bottom groove instead of a 'V' bottom groove with a flat. The housing has a 'V' bottom groove with a flat at the bottom of the groove. This design permits for specific load points at connect-latched position.

Table 1 e, row 4 shows a groove angle 30.degree./22 1/2.degree. bottom groove with a counterclockwise radial spring. The groove width is greater than the coil width. By changing the groove angle, the distance between the point of contact and the point at the end of the major axis of the coil is increased, reducing the force at disconnect.

Table 1 e, row 5 shows an angle 60.degree./22 1/2.degree. bottom groove with a counterclockwise radial spring. The groove width is greater than the coil width.

Table 1 e, row 6 shows a special V type bottom with a 23.degree. and 60.degree. angle with a counterclockwise radial spring. The groove width greater than the coil width.

Table 1 e, row 7 shows a V type bottom groove with 23.degree. and 60.degree. angles like Table 1 e, row 6 with a counterclockwise radial spring. The groove width is greater than the coil width. By moving the shaft forward and then back it causes the spring to turn so the point of contact is closer to the point at the end of the major axis of the coil, increasing the force required to disconnect. When the direction of latching is reversed, the piston is traveling in the direction of the back angle in Table 1 e, row 8, column 2, as opposed to traveling in the direction of the front angle in Table 1 e, row 7, column 2. The increased force increases the turning of the spring, thus increasing the distance between the point of contact and the end point of the major axis, decreasing the force required to disconnect or unlatch. Compare Table 1 e, row 7, column 8 showing the piston moving forward and the position of the point of contact 'A' with the position of the point of contact Table 1 e, row 7, column 7.

Table 1 e, row 9 shows a special V bottom type groove with 22.degree. and 60.degree. angles with a radial spring. The contact point is close to the point at the end of the major axis of the coil for a high disconnect force.

Table 1 e, row 10 through Table 1 f, row 5 show turn angle springs, assembled in different groove designs. Notice the point of contact position in relation to the POINT AT THE END OF THE major axis of the coil.

More specifically, Table 1 e, row 10 shows a special V-bottom with 23.degree. and 60.degree. angles with a 20.degree. turn angle spring.

Table 1 f, row 2 shows a special V-bottom with 30.degree. and 60.degree. angles with a 20.degree. turn angle spring.

Table 1 f, row 3 shows a special V-bottom with 60.degree. and 49.degree. angles with a 20.degree. turn angle spring.

Table 1 f, row 4 shows a special groove with a 45.degree. turn angle spring. In this case, the point of contact is closer to the point at the end of the minor axis of the coil. Upon insertion, the pin will cause the spring to expand radially and causing the coil to deflect along the minor axis and causing the spring coils to turn counterclockwise to connect. At disconnect the spring coils will deflect along the minor axis and the coils will continue to turn counterclockwise to disconnect. The spring coils will turn clockwise to its original position when the force acting on the spring is released.

Table 1 f, row 5 shows a special tapered groove with a 30.degree. angle with a 45.degree. angle at the piston groove. Notice the point of contact in relation to the point at the end of the major axis of the coil.

Table 1 f, rows 6-8 show an axial spring mounted in a tapered bottom groove.

More specifically, Table 1 f, row 6 shows an angular groove with an RF axial spring with a groove depth greater than the coil width. Notice the position of the point of contact at disconnect with the coil diameter expands radially permitting disconnect.

Table 1 f, row 7 shows a groove similar to FIG. 38, but with a tapered angle on one side of the groove.

Table 1 f, row 8 shows a symmetrical angle groove with an RF axial spring. The groove depth is greater than the coil width.

Table 1 f, row 9 shows a flat bottom-housing groove with a counterclockwise radial spring. The groove width is greater than the coil height. In this case, the piston has a step groove.

Table 1 g, rows 2-6 show various methods of mounting a panel on a housing, using a length of spring whose groove can be mounted on the housing or on the panel and such groove has a groove width smaller than the coil height so that the spring can be retained in such groove.

Table 1 g, row 2 shows a panel-mounted design with length of spring with axial loading and holding.

Table 1 g, row 2, column 2 shows the panel in an inserting position. Table 1 g, row 2, column 3 shows the panel in a connected position. Table 1 g, row 2, column 4 shows a schematic of the groove design. Table 1 g, row 2, column 5 shows the spring being inserted into the cavity. Table 1 g, row 2, column 7 shows the spring in a holding position. Table 1 g, row 2, column 11 shows an enlarged view of Table 1 g, row 2, column 7.

Table 1 g, row 3 shows a panel mounting design with length of spring with some axial loading and latching, using a flat tapered groove. The groove width is smaller than the coil height. This particular design will permit axial movement of the panel. Table 1 g, row 2, column 3 shows the design in a latch position, which can permit axial movement. Table 1 g, row 3, column 8 shows an enlarged view of the latch position. Table 1 g, row 3, column 5 shows the point in contact in relation to the end major axis of the coil.

Table 1 g, row 4 shows a panel mounting design with length of spring with latching, which will permit axial movement of the panel and locking, using a rectangular groove on the panel with the groove width smaller than the coil height.

Table 1 g, row 4, column 3 shows the design in a latch axial position, permitting some axial movement. Table 1 g, row 4, column 5 shows an enlarged view of the latch position. Table 1 g, row 4, column 9 shows a latch locked position to disconnect. Table 1 g, row 4, column 11 shows an enlarged view of the point of contact with end of major axis of the coil at locking.

Table 1 g, row 5 shows a panel mounting with length of spring with axial loading and latching. Groove width smaller than the coil height.

Table 1 g, row 5, column 2 shows the panel in an inserting position and Table 1 g, row 5, column 3 in a latched position with the spring retained in the groove mounted in the housing with the grooves offset from each other. The grooves are offset to provide axial loading in the latched position. In this case, the panel has a V-groove design. Notice the axially loaded position of the spring to prevent axial movement when in a connected-latched position.

Table 1 g, row 6 shows a panel assembly similar to Table 1 g, row 5 except that the panel has a step flat bottom groove instead of a V-bottom type groove and the housing has a flat tapered bottom groove and it is axially loaded in the connect position. Disconnect in the axial position will not be possible because as the panel is pulled it causes the spring to turn, applying the disconnect component force at the end of the major axis of the coil where no deflection occurs.

The descriptions illustrated in Tables 1 g, rows 2-6 show the holding, latching, and locking in the axial position. Separation of the panel from the housing can be done by sliding the panel longitudinally.

These designs indicated in Table 1 g, rows 2-6 show a panel-mounted design; however, the design could also be applicable to other designs, such as cylindrical, rectangular, elliptical or other types of surfaces. All designs are shown with GW<CH; however the groove could be made wider to be GW<CH with lower connect-disconnect force.

Table 1 g, rows 7-9 are similar to Table 1 e, row 3, show different methods of retaining the spring in the cavity.

Table 1 g, row 7 shows a rectangular washer retaining the spring in position.

Table 1 g, row 8 shows a snap ring retaining the spring in position.

Table 1 g, row 9 shows a washer retained in position by rolling over a portion of the housing on to the washer housing to form the retaining groove.

The designs are shown with specific dimensions, angles and groove configurations. These values can be changed to other angles and groove configurations while achieving the results indicated.

Piston Mounted Designs for Latching Applications.

Table 2 a-2 g show various designs with the spring mounted in the piston in latching applications. In essence, these applications are similar to the ones that are described in Tables 1 a-1 g except that the spring is mounted in the piston and it encompasses 48 variations of groove designs.

Table 2 a, row 2 shows a flat bottom groove with counterclockwise radial spring with a groove width greater than the coil width. Table 2 a, columns 2-9, show different assemblies of the spring and grooves and the spring in various positions.

Table 2 a, row 2, column 2 shows the assembly in an insert position.

Table 2 a, row 2, column 3 shows the assembly in a latch position.

Table 2 a, row 2, column 4 shows the cross section of the flat bottom groove.

Table 2 a, row 2, column 5 shows an enlarged view of Table 2 a, row 2, column 2.

Table 2 a, row 2, column 6 shows the position of the spring in a hold-RUNNING position with the spring deflected along the minor axis.

Table 2 a, row 2, column 7 shows an enlarged position of Table 2 a, row 2, column 3 in a latched-connect position moving in a disconnect direction relative to the end point of the major axis.

Table 2 a, row 2, column 8 shows the assembly in hold-disconnect direction.

Table 2 a, row 2, column 9 shows the assembly returning to the inserting position.

Table 2 a, row 2, column 10 shows the spring in a free position.

Table 2 a, row 2, column 11 shows a partial enlarged view of Table 2 a, row 2, column 7.

Table 2 a, row 2, column 12 shows a cross sectional view of the spring showing the position of the front angle.

Table 2 a, row 2, column 13 shows a front view of the spring in a counterclockwise with the radial spring front angle in the front.

Table 2 a, row 3, is the same position as Table 2 a, row 2 except that the spring has been turned around 180.degree.

Table 2 a, row 4 shows a V-bottom groove with a counterclockwise radial spring with a groove width greater than the coil width.

Table 2 a, row 5 shows a flat bottom axial groove with an RF axial spring. The groove width is smaller than the coil height. The point of contact is close to the end point of the major axis of the coil, requiring a high force to disconnect.

Table 2 a, row 6 shows a design as in Table 2 a, row 5 except it uses an F spring.

Table 2 a, rows 7-9 and Table 2 b, row 2 shows a radial spring turned into an axial spring, using a flat bottom groove.

Table 2 b, row 3 shows a V-bottom groove with an RF axial spring. The groove width is smaller than the coil height.

Table 2 b, row 4 shows a flat bottom groove with an RF axial spring. The groove width is greater than the coil height, thus resulting in lower disconnect force.

Table 2 b, row 5 shows a V-bottom tapered groove with an RF axial spring. The groove width is greater than the coil height.

Table 2 b, row 6 shows a design like Table 2 b, row 8, except that the RF axial spring has offset coils that fit into the groove. The offset coils allow partial contact holding within the groove at different intervals along the groove diameter walls, and the coils are deflected axially at different points of the groove on both sides sufficiently to retain the spring in place. The offset coils increase the total axial coil height, which helps retain the spring inside the groove. The insertion and running forces are also reduced compared to Table 2 b, row 8 where the groove width is smaller than the coil height. The difference in force is illustrated in Table 2 b, row 5, column 12, where we show force versus shaft travel distance, illustrating the force developed in Table 2 b, row 7 and in Table 2 b, row 6.

Table 2 b, row 6, column 12 shows a diagram Force vs. Shaft Travel Distance that compares the force developed by Table 2 b, row 7 vs. Table 2 b, row 6.

Table 2 b, row 6, columns 14-15 shows the offset coils in a free position.

Table 2 b, row 6, column 11 shows the point of contact in relation to the point at the end of the major axis of the coils with the point of contact further away from the end point of the major axis of the coil thus decreasing the force required to disconnect. This can be compared with Table 2 b, row 7, column 11 whereby the point of contact is closer to the end point of the major axis of the coil, thus requiring a substantially higher force to disconnect.

Table 2 b, row 7 shows an axial RF spring with a tapered bottom groove that positions the point of contact (Table 2 b, row 7, column 11) closer to the end point of the major axis of the coil than in Table 2 b, row 6, column 11, thus requiring a greater force to disconnect.

Table 2 b, row 8 shows a tapered bottom groove of a different configuration but similar to Table 2 b, row 7 with an RF axial spring with a groove width smaller than the coil height. The groove configuration positions the point of contact closer to the end point at the end of the major axis of the coil. An axial RF spring is used in this design.

Table 2 b, row 9 shows a tapered bottom groove with RF axial spring with a groove width smaller than the coil height. The end point of contact is positioned at the point of contact at the end point of the major axis of the coil and disconnect is not possible as the force is applied along the major axis since the spring will not compress along that axis.

Table 2 c, row 2 shows a tapered bottom groove with an axial spring mounted in the groove. The position of the spring is such that the centerline along the minor axis is slightly above the bore, thus positioning the point of contact further away from the end point of the major axis of the coil, resulting in a lower disconnect force.

Table 2 c, row 3 shows a tapered bottom groove with an axial spring mounted in the groove. The groove is shown with a 25-degree angle. By increasing the angle, the distance from the end point of the major axis of the coil to the point of contact increases (Table 2 c, row 3, column 11 compared to Table 2 b, row 9, column 11), resulting in lower connect and disconnect forces. On the other hand, decreasing the taper angle will bring the point of contact closer to the end point of the major axis of the coil, resulting in higher connect and disconnect forces. Increasing the groove angle will increase the spring deflection which will increase the running force (Table 1 c, row 2, column 6, Table 1 c, row 3, column 8).

Table 2 c, row 4 shows a tapered bottom groove with an RF axial spring with the shaft inserted in the opposite direction. The groove width is smaller than the coil height. In this case, again, the point of contact is at the end point of the major axis of the coil and no deflection exists and a disconnect is not possible.

Table 2 c, row 5 shows a tapered bottom groove with 45.degree. turn angle spring with the shaft inserted in the convex direction. The groove width is smaller than the coil width. The angular spring deflects axially.

Table 2 c, row 6 shows a tapered bottom groove with an RF axial spring filled with an elastomer with a hollow center. The groove width is smaller than the coil height (GW<CH).

Table 2 c, row 7 shows a tapered bottom groove with an RF axial spring filled with an elastomer solid, as in Table 2 c, row 6 with the groove width smaller than the coil height (GW<CH).

Table 2 c, row 8 shows a step round flat bottom groove with an RF axial spring groove with the width smaller than the coil height. This design has a groove with a point of contact that scrapes the wire as the coil moves, removing oxides that may be formed on the surface of the wire. The groove has been designed to provide a lower force at disconnect by increasing the distance between the point of contact and the end point of the major axis of the coil.

Table 2 c, row 9 shows an inverted V bottom groove with an RF axial spring. The groove width is smaller than the coil height.

Table 2 d, row 2 shows a tapered bottom groove with a counterclockwise radial spring mounted in an RF position. The groove width is smaller than the coil height. Notice the position of the point of contact with respect to the end point at the end of the major axis of the coil. The closer the point of contact to the end point of the major axis of the coil, the higher the force required to disconnect.

Table 2 d, row 3 shows a tapered bottom groove with a counterclockwise radial spring mounted in an F axial position. The groove width is smaller than the coil height.

Table 2 d, row 4 shows a tapered bottom groove with a clockwise radial spring mounted in an RF axial position. The groove width is smaller than the coil height.

Table 2 d, row 5 shows a tapered bottom groove with a clockwise radial spring mounted in an F axial position. The groove width is smaller than the coil height.

Table 2 d, row 6 shows a dovetail groove with a counterclockwise radial spring.

Table 2 d, row 7 shows a special groove with a counterclockwise radial spring.

Table 2 d, row 8 shows an angle of zero to 221/2 degrees flat and tapered bottom groove with a counterclockwise radial spring. The groove width is greater than the coil width. The spring in latching will turn clockwise positioning the coil to reduce the force required to disconnect by positioning the point of contact further away from the end of the end point at the end of the major axis of the coil.

Table 2 d, row 9 shows an angle of 0 to 221/2 degrees. The piston groove has a flat and a tapered bottom with a clockwise spring. The spring has an ID to coil height ratio smaller than 4. Under load, this spring has a higher torsional force that requires a higher force to connect or disconnect the shaft. Upon latching, the spring turns clockwise, moving the point of contact closer to the end point of the major axis of the coil (Table 2 d, row 9 column 7, column 11) thus increasing the force to disconnect.

Table 2 e, row 2 is like Table 2 d, row 9 except that in this case, the spring groove has an ID to coil height ratio greater than 4, thus the torsional force applied to the spring at connect or disconnect is substantially lower. As the ratio of the ID of the spring to the coil height increases, the force required to connect or disconnect decreases due to a lower torsional force.

Table 2 e, row 3 has an angle groove with a 0.degree. to 22.5.degree. piston groove angle similar to Table 2 a, row 4 except that the piston groove in Table 2 e, row 3 has a 'V' bottom groove instead of a 'V' bottom groove with a flat. The housing in Table 2 e, row 3 has a 'V' bottom groove with a flat at the bottom of the groove. This design permits for specific load points at connect-latched position.

Table 2 e, row 4 shows a groove angle 30.degree./221/2.degree. bottom groove with a counterclockwise radial spring. The groove width is greater than the coil width. By changing the groove angle, the distance between the point of contact and the end point of the major axis of the coil is increased, reducing the force at disconnect.

Table 2 e, row 5 shows an angle 60.degree./221/2.degree. bottom groove with a counterclockwise radial spring. The groove width is greater than the coil width.

Table 2 e, row 6 shows a special V type bottom with a 23.degree. and 60.degree. angle with a counterclockwise radial spring. The groove width is greater than the coil width.

Table 2 e, rows 7-8 show a V type bottom groove with 23.degree. and 60.degree. angles like Table 2 e, row 6 with a counterclockwise radial spring. The groove width is greater than the coil width. By moving the shaft forward and then back we cause the spring to turn so the point of contact is closer to the end point at the end of the major axis of the coil, increasing the force required to disconnect. When the direction of latching is reversed, the piston is traveling in the direction of the back angle in Table 1 e, row 7, as opposed to traveling in the direction of the front angle in Table 1 e, row 6. The increased force increases the turning of the spring, thus increasing the distance between the point of contact and the end point of the major axis, increasing the force required to disconnect or unlatch. Compare Table 2 e, row 7, column 8 showing the piston moving forward and the position of the point of contact "A" with the position of the point of contact Table 2 e, row 8, column 7.

Table 2 e, row 9 shows a special V bottom type groove with 22.degree. and 60.degree. angles with a radial spring. The contact point is close to the end point at the end of the major axis of the coil for a higher disconnect force.

Table 1 f, rows 2-6 show turn angle springs, assembled in different groove designs. Notice the point of contact position in relation to the end point of the major axis of the coil.

Table 2 f, row 2 shows a special V-bottom with 23.degree. and 60.degree. angles with a 20.degree. turn angle spring.

Table 2 f, row 3 shows a special V-bottom with 30.degree. and 60.degree. angles with a 20.degree. turn angle spring.

Table 2 f, row 4 shows a special V-bottom with 30.degree. and 49.degree. angles with a 20.degree. turn angle spring.

Table 2 f, row 5 shows a special groove with a 45.degree. turn angle spring. In this case, the point of contact is closer to the end point at the end of the minor axis of the coil. Upon insertion, the pin will cause the spring to contract radially (Table 2 f, row 5, column 2) and causing the coil to deflect along the minor axis (Table 2 f, row 5, column 6) and causing the spring coils to turn counterclockwise to connect (Table 2 f, row 5, column 7). At disconnect the spring coils will deflect along the minor axis and the coils will continue to turn counterclockwise to disconnect (Table 2 f, row 5, column 8). The spring coils will turn clockwise to its original position (Table 2 f, row 5, column 9) when the force acting on the spring is released.

Table 2 f, row 6 shows a special tapered groove with a 30.degree. angle with a 45.degree. angle at the piston groove. Notice the point of contact in relation to the end point at the end of the major axis of the coil.

Table 2 f, row 7 shows a flat bottom-housing groove with a counterclockwise radial spring. The groove width is greater than the coil height. In this case, the piston has a step groove.

Table 2 f, row 8 shows a panel mounted design with length of spring with axial loading and holding.

Table 2 f, row 8, column 2 shows the panel in an insert position. Table 2 f, row 8, column 3 shows the panel in a connected position. Table 2 f, row 8, column 4 shows a schematic of the groove design. Table 2 f, row 8, column 5 shows the spring being inserted into the cavity. Table 2 f, row 5, column 7 shows the spring in a holding position. Table 2 f, row 8, column 11 shows an enlarged view of Table 2 f, row 5, column 7 with the panel bottoming.

Table 2 f, row 9 shows a panel mounting design with length of spring with some axial loading and latching, using a flat tapered groove. The groove width is smaller than the coil height. This particular design will permit axial movement of the panel. Table 2 f, row 9, column 3 shows the design in a latch position, which will permit axial movement. Table 2 f, row 9, column 7 shows an enlarged view of the latch position. Table 2 f, row 9, column 11 shows the point in contact in relation to the end point of the major axis of the coil.

Table 2 g, row 2 shows a panel mounting design with length of spring that will permit axial movement of the panel and locking, using a rectangular groove on the housing with the groove width smaller than the coil height.

Table 2 g, row 2, column 3 shows the design in a latch axial position, permitting some axial movement. Table 2 g, row 2, column 7 shows an enlarged view of the latch locking means and Table 2 g, row 5, column 10 shows an enlarged view of the point of contact with end of major axis of the coil.

Table 2 g, row 3 shows a panel mounted design using a length of spring. The groove width is smaller than the coil height. Table 2 g, row 3, column 2 shows the panel in an inserting position and Table 2 g, row 3, column 3 in a latched position with the spring retained in the groove mounted in the housing with the grooves offset from each other. The grooves are offset to provide axial loading in the latched position. In this case, the panel has a V-groove design. Notice the axially loaded position of the spring to prevent axial movement when in a connected-latched position.

Table 2 g, row 4 shows a panel assembly similar to Table 2 g, row 3 except that the panel has a step flat bottom groove instead of a V-bottom type groove and the panel has a flat tapered bottom groove and it is axially loaded in the connect position. Disconnect in the axial position will not be possible because as the panel is pulled it causes the spring to turn, applying the disconnect component force at the end point of the major axis of the coil where no deflection occurs. The descriptions illustrated in Table 2 f, row 8 through Table 2 g, row 4 show the holding, latching, and locking in the axial position. Separation of the panel from the housing can be done by sliding the panel longitudinally.

The designs indicated in Table 2 f, row 8 through Table 2 g, row 4 show a panel mounted design; however the design could also be applicable to other designs, such as cylindrical, rectangular, elliptical or other types of surfaces. All designs are shown with GW<CH; however the groove could be made wider to be GW<CH with lower connect-disconnect force.

The designs are shown with specific dimensions, angles and groove configurations. These values can be changed to other angles and groove configurations while achieving the results indicated.

Spring Characteristics that Affect Performance

Spring Design and Installation Factors

Using an axial spring to enhance retention of the spring in the groove or using a radial spring turned into an axial spring at installation.

Using an axial spring or a radial spring turned into an axial spring at installation to increase initial insertion, running and disconnect forces Changing the Coil Width to Coil Height Ratio When the coil width to height ratio is close to one, the spring will turn easier reducing forces since the spring is round.

The smaller the coil width to coil height ratio, the smaller the back angle. The smaller the back angle, the higher the insertion force required when the piston is inserted in the spring into the back angle first. The opposite is true when the coil width to coil height ratio is reversed, i.e., the back angle is larger and the insertion forces are lower.

Using an F axial spring to increase the insertion running and disconnect forces compared to an RF spring.

Using an RF axial spring to reduce the insertion, running, and disconnect forces.

Using an offset axial spring to reduce the initial insertion running force, and disconnect forces.

Using a length of spring mounted in an axial type groove for panel applications

Using a spring with a ratio of ID to coil height to vary insertion, connect and the disconnect forces. As the ratio increases, the forces will decrease or vice versa as the ratio decreases the forces increase.

Using springs with varying turn angles to vary forces.

Using an axial spring with offset coils where the groove width is smaller than the coil height and addition of the coil height of the various coils to reduce insertion, running, connect, and disconnect forces and the ratio of connect to disconnect force.

The connect/disconnect forces decrease as the ratio of ID to coil height increases.

Using variable means to form the ring, ranging from threading the ends, latching the ends, interfacing the ends and butting as opposed to welding.

Varying the Device Geometry to Control the Forces

Designing the groove geometry to position the point of contact at disconnect relative to the end point of the major axis of the coil.

Positioning the end point of the spring major axis. The shorter the distance to the contact point, the higher the force required to disconnect.

Positioning the end point of the spring minor axis. The shorter the distance to the contact point, the lower the force required to disconnect.

Varying the groove design and insertion direction to vary the force.

Varying the groove geometry so that the spring torsional force in the latched position is in an axial direction thus increasing the force required to disconnect and minimizing axial play.

Position the latching grooves so that they are offset, causing the axial or radial spring coils to turn, introducing an axial force that reduces axial play and increases the force required to connect-disconnect. Table 1 g, row 5, column 12; row 2, Table 2 a, row 6, column 6 and row 8, column 6.

Position the geometry of the latching grooves that will cause the axial and radial spring coils to turn, increasing the force required to connect-disconnect. FIGS. 12E and 13E.

The use of multiple springs and grooves to increase the forces and the current carrying capacity.

The forces vary according to the direction of the piston insertion.

Using threaded grooves with a spring length retained in the groove with a groove width smaller than the coil height.

In accordance with the present invention to attain the maximum disconnect force, the point of contact should be as close as possible to the end of the major axis of the coil. Table 1 and Table 2 a (rows 5, columns 7 and 11).

To attain the minimum disconnect force, the contact point, should be as close as possible to the end of the minor axis of the coil. Table 1 a and Table 2 a (row 1, column 7 and 11).

An axial spring with offset coils mounted in a housing with the groove width smaller than the addition of the coil height of the various coils, providing the following features:

Lower spring retention force.

Lower insertion force

Lower ratio of disconnect to connect

Lower ratio of disconnect to running force.

Reference Table 1 b and Table 2 b, row 6 vs. row 8.

Modification of the groove cavity that affects the position of the point of contact in relation to the end point of the major axis of the coil that affects the force required to disconnect, connect. Reference Table 1 b and Table 2 b, row 8 vs. row 9 and row 8, column 4 vs. row 9, column 4.

Modification of the groove cavity that affects the position of the point of contact in relation to the end of the major axis of the coil that affects the force required to disconnect-connect. Reference Table 1 b and Table 2 b, row 9 vs. Table 1 c, 2c, row 2 and Table 1 a, 2a, row 9, column 4 vs. Table 2 a, 2c, row 2, column 4.

The greater the interference between the coil height and the groove width, the higher the force required to disconnect. Table 1 a and Table 2 a (row 5, column 5 versus Table 1 b, 2b, row 4, column 5) Table 1 a, 2a, row 5, column 5 has interference between the coil height and the groove width while row 6 shows a clearance between the coil height and the groove width.

The higher the position of the coil centerline along the minor axis in relation to the groove depth. (Reference Table 1 b and Table 2 b, row 8, column 4 versus Table 1 c, 2c, row 2, column 4) the higher the force required to disconnect.

The type of axial spring mounted in a housing or piston RF vs. F with RF having substantially more deflection but lower force compared to F. Reference Table 1 a and Table 2 a, row 5, column 2, column 5, and column 6 versus row 6, column 2, column 5 and column 6.

Manner and type of spring used affects the force required to connect/disconnect, using an axial RF or an F spring assembled into a groove whose groove width is smaller than the coil height versus a radial spring turned into an axial spring RF or F spring with coils canting clockwise or counterclockwise. Reference Table 1 a and Table 2 a, rows 5 and 6 versus rows 7, 8, 9 and Table 1 b, 2b row 2 and also row 8 vs. Table 1 d, 2d, rows 2-5.

Direction of movement of the piston or housing a radial spring that affects the force required to connect and disconnect. Reference Tables 1 d, 2 d, row 8, columns 2, 5, 7 and 11 vs. row 9, column 2, 5, 7, and 11 due to variation that exists between row 8 and row 9 between the point of contact and the point at the end of the major axis of the coil that results in substantial variation in forces.

The greater the insertion force of an axial spring into a groove whose GW<CH, the higher the force required to disconnect (Reference Table 1 b, 2b, row 8, column 5 vs. row 9, column 5).

Radial springs with different ratios of spring ID to coil height mounted in a housing or piston. Reference Table 1 d, 2d, row 9 vs. Table 1 e, 2e, row 2. The greater the ratio the lower the forces.

Variations of groove configuration affecting the connect-disconnect force by varying the groove angle. Reference Table 1 e, row 3, column 5, column 7, column 11 vs. row 4, column 5, column 7, column 11. Such angle variation affects the distance between the point of contact and the point at the end of the major axis of the coil. The closer these two points the higher the force required to disconnect.

The effect of axially loading in the latched position or disconnect and the effect on initial disconnect force and travel.

Figure 7E:
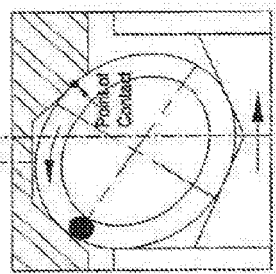
Figure 8D:
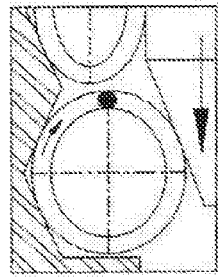
Figure 9A:
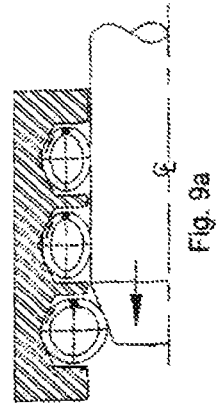
Figure 9B:
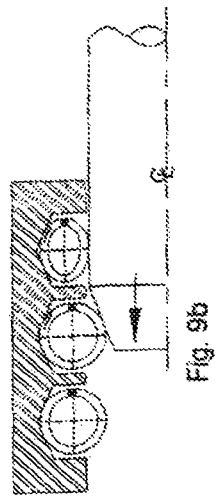
Figure 9C:
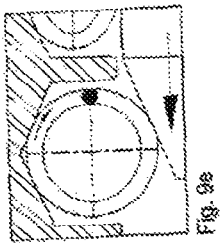
Figure 9E:

A radial spring axially loaded in the latched position will require a higher initial disconnect force than a non-axially loaded spring. (FIGS. 4a and 4e vs. FIGS. 5a and 5e and FIGS. 4-5f vs. 4-5g. Also FIGS. 6a and 6e vs. FIGS. 7a and 7e and FIG. 6-7g). As shown in FIGS. 5a and 7a, an abutting relationship between a housing bore and piston eliminating axial play upon connection. As shown in FIG. 4C, the housing is shown with different cross-hatchings, indicating that the housing groove has a flange forming part attached to the housing.

In that regard, a housing bore, groove, and piston are oriented for enabling the production of an audible sound indicating a connection between the housing and piston upon abutting of the housing bore and piston.

With reference to FIGS. 5A-5D, a major axis of the coil spring is positioned so that it is above an inside diameter of the housing groove.

With reference to FIGS. 7A-7D, a major axis of the coil spring is positioned so that it is below an outer diameter of the piston groove.

An axially loaded axial spring will develop a higher initial force as shown in Table 1 g, row 2, column 3, column 7, column 11 at disconnect than a non-axially loaded, and also Table 2 f, row 8, column 3, column 7 and column 11.

Direction of the spring upon insertion as pointed out by the direction of the arrows. (Canted coil springs always deflect along the minor axis of the coil). The spring turns in the direction of the arrow, as shown in the following:

FIGS. 1A, 1B forward in the direction of the arrow, Table 1 a and Table 2 a, row 2, column 8 and column 11 in the opposite direction.

An axial spring axially loaded in the latched position will require a higher disconnect force than a non-axially loaded spring.

Recognizing the direction in which the spring will deflect and may turn, assists in selecting the groove configuration. When the load is applied, the spring always deflects along the minor axis of the coil as it is the easiest way to deflect. The spring turns when the ratio of the coil width to the coil height is equal to 1 or greater. As the ratio increases, the ability of the spring coils to turn decreases, causing the spring to deflect instead of turn. Specifically, A spring with different turn angles in conjunction with different grooves to vary the force to connect and disconnect. Turn angles permit the design of the grooves so that the spring does not have to be turned at assembly. Reference Table 1 f and Table 2 f, rows 2, columns 2, 7, 11 and row 6, columns 2, 5, 7 11;

Disconnect by expanding the ID of the spring and compressing the coils along the minor axis of the coils to affect insertion, connect and disconnect. Table 1 f, rows 6-8;

Housing mounted grooves using a single groove versus a split groove. Note: all drawings in Table 1 a show a split groove and Table 2 a shows a single groove in row 4, column 2;

Panel mounted spring with groove width smaller than the coil height using a spring in length. Axial latching and axial loading the spring to prevent axial movement. Table 1 g, rows 2-3, Table 2 g, rows 8-9;

Axial loading the spring coils by offsetting the position of the grooves axially between the housing and shaft so as to create an axial load on the spring to reduce or eliminate movement between the shaft and housing. This configuration has a higher force as shown in FIGS. 4-5;

Multiple springs mounted in multiple single grooves of any of the designs in Tables 1 a-1 g, Tables 2 a-2 g and in FIGS. 1-18F with either radial or axial springs that can be mounted radially or axially with springs for variable force retention, play or no play and conductivity. See FIGS. 8 and 9.

Figure 10A:
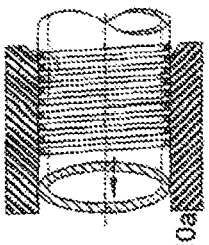
Figure 10B:
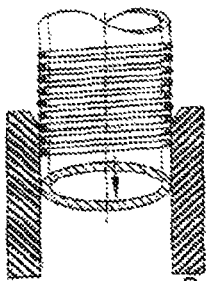
Figure 10C:
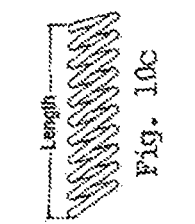
Figure 11A:
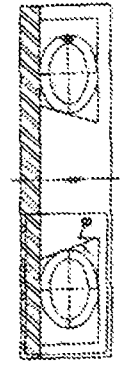
Figure 11B:
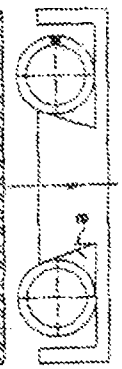
Figure 11C:
Figure 12A:
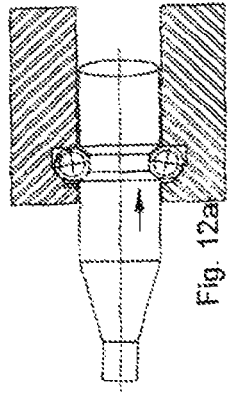
Figure 12B:
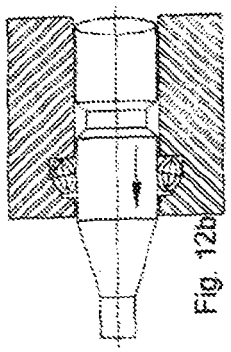
Figure 12C:
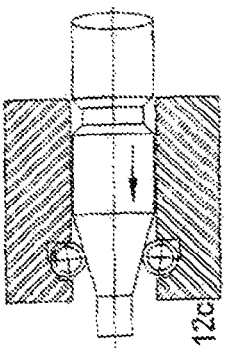
Figure 16K:
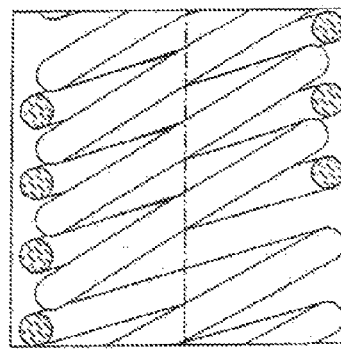
FIGS. 16A-16L show a spring with the coil ends connected by interlacing the end coils to form a continuous spring-ring without welding or joining.
Figure 16L:
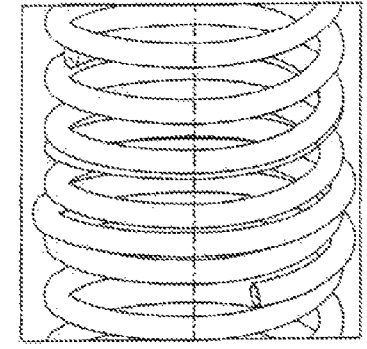
Figure 16C:
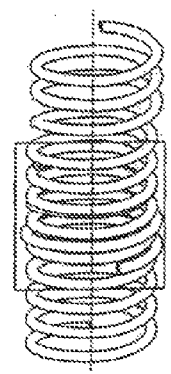
Figure 16B:
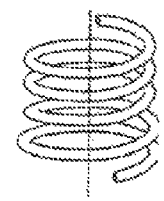
Figure 16A:
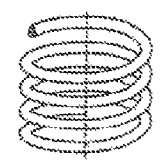
Figure 16F:
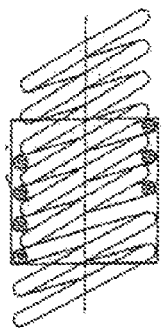
Figure 16E:
Figure 16D:
Figure 16I:
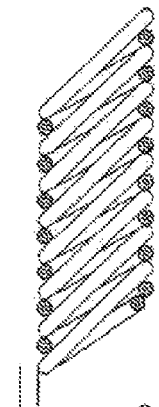
Figure 16J:
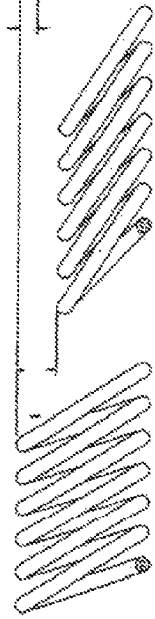
Figure 16G:
Figure 16H:
Figure 17C:
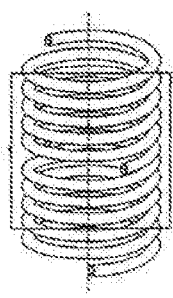
FIGS. 17A-17L show a spring with coils ends butted inside the groove forming a spring-ring without welding.
Figure 17B:
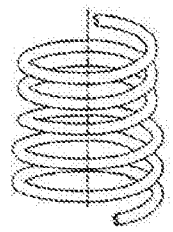
Figure 17A:
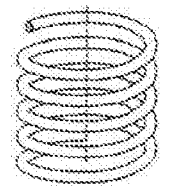
Figure 17F:
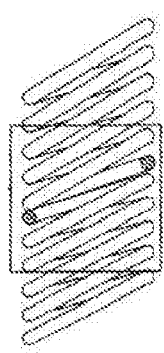
Figure 17E:
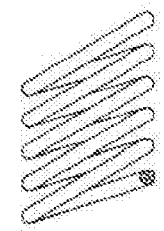
Figure 17D:
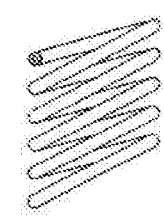
Figure 17I:
Figure 17H:
Figure 17G:
Figure 17J:
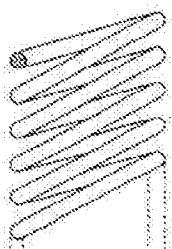
Figure 17K:
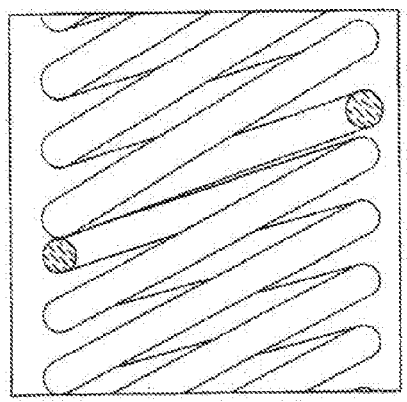
Figure 17L:
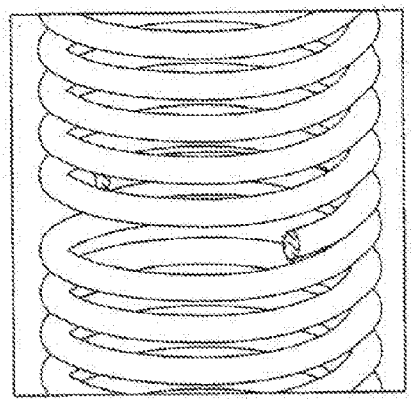
Figures 18D, 18E, 18F:
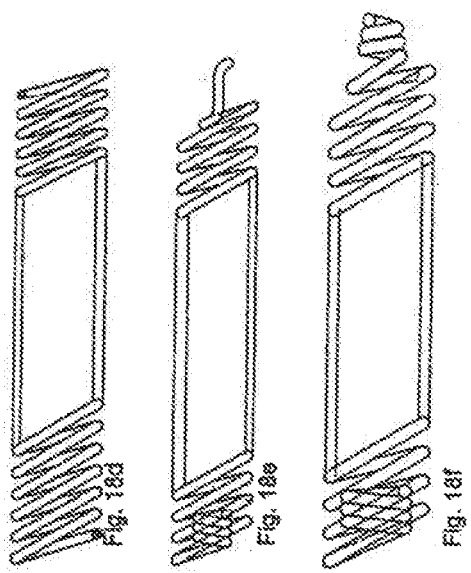
FIGS. 18A-18F show an unwelded spring ring and to be housed in a flat bottom housing groove, front angle in the front, showing the various different designs that could be used to retain the spring in a groove that can be a housing groove or a piston groove.
Figure 18C:
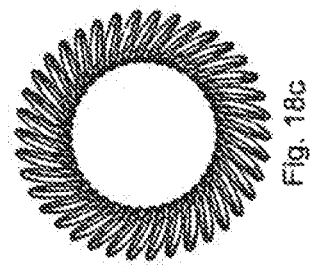
Figure 18B:
Figure 18A:
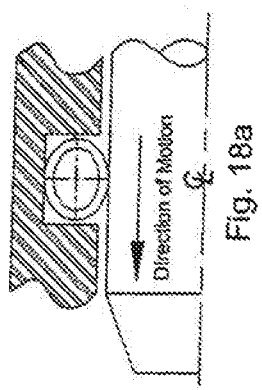

Threaded grooves using a spring length retained in the groove having a groove width smaller than the coil height. FIGS. 10A, 10B and 10D;

Threaded grooves using a radial or turn angle spring in length using a groove having a groove width greater than the coil width (GW>CW) Table 1 a, row 1, column 2, row 4, column 2 and Table 1 d, rows 6-9 through Table 1 f, row 5 and Table 2 g, row 2 and Table 2 f, row 7 and FIGS. 5, 6, 7 and 8;

Panel mounted in a housing radial or axial spring in length and the spring can be retained in the panel or the housing for axial holding, latching or locking the panel to the housing and when in a latched or locked position the panel may be axially loaded to eliminate axial play;

Various types of spring-ring groove mounted designs with variable means to form a ring, ranging from threading the ends, latching the ends, interfacing the ends and butting, using non-welded springs to form a ring. FIGS. 15, 16, 17, and 18;

Different groove configurations that affect the force parameters, depending on the position of the point load in reference to the end point of the major axis of the coil that affects the ratio of disconnect to insertion, disconnect to running force, and the disconnect forces with a radial spring;

A radial or axial spring whose coil width to coil height ratio is one that will require higher force at connect and disconnect due to the smaller back angle of the coil. The closer the ratio to one the higher the force required to disconnect-connect; The smaller the groove width to coil height ratio, the higher forces. Reference Table 1, row 8, column 4 vs. Table 1, row 9, column 4;

Variation of the groove geometry by including a step groove design to control the position of the contact point relative to the end point of the centerline. Table 1 f, row 9, column 2, 7, and 11;

Variation of the groove geometry to control the position of the point of contact and the end point of the centerline. Table 1 f, rows 6-8;

Device with high forces created by offsetting the centerlines of the grooves as shown in Table 2 a, rows 6 and 8;

Reversing the direction of travel in a clockwise or counterclockwise radial spring will switch from the front angle to the back angle or vice versa, thus changing the relative position of the contact point with respect to the end point of the centerline thus varying the forces. See Table 1 e and Table 2 e, rows 7, column 8 and row 8, column 7 comparing the position of the contact point to the end point centerline; and With reference again to FIG. 4b, the piston 300 has a piston groove 302, a length, a piston diameter 304, a transition section 306 defining the opening of the piston groove 302. The bottom 308 of the piston groove 302 has a smaller diameter than the piston diameter 304.

Retention of radial spring with a dovetail type groove Table 1 d and 2 d, rows 6-7.

Although there has been hereinabove described a specific spring latching connectors radially and axially mounted in accordance with the present invention for the purpose of illustrating the manner in which the invention may be used to advantage, it should be appreciated that the invention is not limited thereto. That is, the present invention may suitably comprise, consist of, or consist essentially of the recited elements. Further, the invention illustratively disclosed herein suitably may be practiced in the absence of any element which is not specifically disclosed herein. Accordingly, any and all modifications, variations or equivalent arrangements which may occur to those skilled in the art, should be considered to be within the scope of the present invention as defined in the appended claims.

What is claimed is:

1. A spring latching connector comprising:
 a housing having body with an exterior surface and an interior surface defining a bore;
 a piston having a solid piston body such that no fluid can flow through the piston, said piston having an exterior surface and a piston axis located in said bore by moving the piston relative to the housing in a first direction so that a tapered insertion end lifts a radial canted coil spring comprising a plurality of coils in moving in the first direction to be located in said bore, said insertion end having a planar end surface extending across a lengthwise axis of the piston and wherein each coil has a major axis and a minor axis;
 a housing groove formed in said housing bore and a piston groove having a tapered bottom wall or a tapered sidewall formed on the exterior surface of said solid piston body, the housing groove and the piston groove being abutted by the radial canted coil spring such that the major axis and the minor axis of the plurality of coils are orientated at a non-orthogonal turn angle to said piston axis;
 the radial canted coil spring, disposed in the housing and piston grooves and latching said piston and housing together in a latched position;
 opposing surfaces in the housing and piston grooves simultaneously contacting and positioning a point of spring to piston contact and a point of spring to housing contact to create an axial load on the plurality of coils of the radial canted coil spring for enabling the radial canted coil spring to remain abutted between the housing groove and the piston groove in the latched position;
 wherein the housing groove comprises a groove surface that is recessed from the interior surface of the housing and the tapered bottom wall or tapered sidewall of the piston groove comprises a groove surface that is recessed from the exterior surface of the solid piston body and wherein the housing groove and the piston groove are sized and shaped to deflect the plurality of coils of the radial canted coil spring to permit separation of the piston from the housing when the piston is moved in a second direction opposite the first direction; and
 wherein the radial canted coil spring is located along an axial position in the housing groove prior to latching the piston to the housing and after separating the piston from the housing or the radial canted coil spring is located along an axial position in the piston groove prior to latching the piston to the housing and after separating the piston from the housing.

2. A spring latching electrical connector comprising:
 a housing having a bore therethrough and two open ends;
 a piston located in said bore by moving the piston relative to the housing in a first direction, said piston comprising a solid piston body such that no fluid can flow through the piston, a tapered insertion end, and a planar end surface extending across a lengthwise axis of the piston at the insertion end;
 a housing groove formed in said housing bore and a piston groove formed on an exterior of said piston, the housing groove and the piston groove being axially abutted in an axially abutted relationship by a radial canted coil spring in a latched state to eliminate axial play;
 the radial canted coil spring, disposed in the housing and piston grooves for latching said piston and housing together in a latched position, comprising a plurality of coils each with a major axis, a minor axis, and a coil wire diameter sized for cooperating with the housing groove and piston groove, the housing and piston grooves being sized and shaped for controlling, in combination with a spring configuration, a connect force to connect said piston to said housing and a disconnect force to remove said piston from said housing;
 opposing surfaces in the housing and piston grooves simultaneously contacting and positioning a point of spring to piston contact to create an axial load on the plurality of coils of the radial canted coil spring for enabling the radial canted coil spring to maintain the axially abutted relationship between the housing groove and the piston groove in the latched position;

wherein the connector is made from a material configured for electric current flow through the housing, the radial canted coil spring, and the piston;

wherein the piston groove and the housing groove each comprises a tapered surface, relative to a lengthwise axis of the piston, that is sized and shaped to permit separation of the piston from the housing when the piston is moved in a second direction opposite the first direction;

wherein the piston groove comprises a second tapered surface that is tapered relative to the lengthwise axis of the piston; and wherein the radial canted coil spring is located along an axial position in the housing groove prior to latching the piston to the housing and after separating the piston from the housing or the radial canted coil spring is located along an axial position in the piston groove prior to latching the piston to the housing and after separating the piston from the housing.

3. The connector according to claim 1, wherein the housing groove has a bottom wall, a sidewall, and a tapered surface.

4. The connector according to claim 1, wherein the major axes of the plurality of coils are disposed above an inside diameter of the housing bore.

5. The connector according to claim 3, wherein the sidewall of the housing groove is tapered relative to the lengthwise axis of the piston.

6. The connector according to claim 5, wherein the piston comprises a shoulder abutting a side of the housing to restrict movement of the piston in the first direction following the latched position.

7. The connector according to claim 1, wherein the piston comprises a shoulder abutting a side of the housing outside of the housing bore.

8. The connector according to claim 1, wherein the opposing surfaces in the housing and piston grooves position the point of contact proximate the coil major axis of each coil in order to maximize a disconnect force.

9. The connector according to claim 1, wherein the opposing surfaces in the housing and piston grooves position the point of contact proximate to the end point of the minor axis in order to minimize a disconnect force.

10. The connector according to claim 1, wherein a coil height and a piston groove width are adjusted to control disconnect and connect forces.

11. The connector according to claim 1, wherein said radial canted coil spring is turnable in said piston groove for enhancing electrical conduction between said piston and said housing by removing oxidation on said spring.

12. The connector according to claim 1, wherein said radial canted coil spring is a counterclockwise radial spring.

13. A spring latching electrical connector comprising:
a housing having a bore therethrough and two open ends;
a piston having a solid piston body such that no fluid can flow through the piston, said piston being slidably received in said bore by moving the piston relative to the housing in a first direction so that a tapered insertion end lifts a radial canted coil spring in moving in the first direction to be in said bore, said tapered insertion end comprises a planar end surface extending across a lengthwise axis of the piston;
a housing groove comprising a tapered surface formed in said housing bore and a piston groove comprising two tapered surfaces having an apex or a bottom wall in between the two tapered surfaces, the two tapered surfaces being tapered relative to the lengthwise axis of the piston formed on an exterior of said piston, the housing groove and the piston groove sized and shaped to permit disconnection of the piston from the housing;
the radial canted coil spring, which comprises a plurality of canted coils each with a major axis and a minor axis, is disposed in the housing groove and the piston groove and simultaneously contacts both the housing groove and the two tapered surfaces of the piston groove to latch said piston and housing together in a latched position, the housing and piston grooves being sized and shaped for controlling, in combination with a spring configuration, a connect force to connect said piston to said housing and a disconnect force to disconnect said piston from said housing, whereupon said radial canted coil spring deflects from a first canted angle to a second canted angle to enable separation of said piston from said housing when said piston moves in a second direction opposite the first direction;
the piston groove, the housing groove, and the spring being shaped and oriented so that the disconnect force is higher than the connect force;
wherein the connector is made from a material configured for electric current flow through the housing, the radial canted coil spring, and the piston; and
wherein the piston comprises a shoulder abutting a side of the housing to restrict movement of the piston in the first direction following the latched position.

14. The connector of claim 13, wherein the tapered surface of the housing groove positions a point of spring to piston contact proximate the major axis in order to maximize the disconnect force.

15. The connector according to claim 13, wherein the tapered surface of the housing groove positions a point of spring to piston contact proximate an end point of the minor axis in order to minimize the disconnect force compared to when the point of spring to piston contact is further away from the end point of the minor axis.

16. The connector according to claim 13, wherein the housing groove comprises two sidewalls.

17. The connector according to claim 16, wherein the two sidewalls of the housing groove are both tapered relative to a lengthwise axis of the housing.

18. The connector according to claim 13, wherein the piston is disconnectable from the housing by canting a plurality of coils further than when the plurality of coils are in the latched position.

19. The connector according to claim 13, wherein the housing groove comprises two sidewall surfaces that converge at a point and wherein the tapered surface is one of the two sidewalls that converge.

20. A method of retaining a spring in a connector comprising:
providing a housing with a bore having housing groove and two open ends;
providing a piston with a solid body such that no fluid can flow through the piston, said piston being elongated and having a tapered insertion end, a planar end surface extending across a lengthwise axis of the piston at the insertion end, and a piston groove having two tapered surfaces having an apex or a bottom wall in between the two tapered surfaces, the two tapered surfaces being tapered relative to a lengthwise axis of the piston on an exterior of the piston and positioning the piston in said bore of said housing by moving the piston in a first direction relative to the housing;

securing a radial canted coil spring by simultaneously contacting a plurality of coils with the housing groove and the two tapered surfaces of the piston groove to bias the radial canted coil spring at a first canted angle against both the housing groove and the piston groove in a latched configuration so that electrical flow can flow across the housing, the piston, and the radial canted coil spring;

the housing and piston grooves being sized and shaped for controlling, in combination with a spring configuration, a connect force to connect said piston to said housing and a disconnect force to disconnect said piston from said housing, whereupon said radial canted coil spring deflects to enable separation of said piston from said housing;

separating the piston from the housing by moving the piston in a second direction opposite the first direction and by canting the plurality of coils from their first canted angle in the latched position in which the plurality of coils simultaneously contact the housing groove and the piston groove to a further canting angle and then removing the piston from the housing; and wherein the housing groove and the piston groove being axially abutted in an axially abutted relationship by the radial canted coil spring in a latched state to eliminate axial play.

21. The method of claim 20, wherein the housing groove, the piston groove, and the spring are shaped and oriented so that the disconnect force is higher than the connect force.

22. The method of claim 20, wherein the housing groove comprises two tapered surfaces that are tapered relative to a lengthwise axis of the housing.

23. The method of claim 20, wherein the piston comprises a shoulder abutting a side of the housing to restrict movement of the piston in the first direction following the latched position.

24. The method of claim 20, wherein the housing groove comprises a bottom wall and a tapered wall, said tapered wall of the housing groove being tapered relative to a lengthwise axis of the housing.

25. A method for latching a piston to a housing of a connector using a spring and unlatching the piston from the housing, said method comprising:

providing a housing comprising a housing bore defining a lengthwise housing axis;

providing a piston with a solid body such that no fluid can flow through the piston, said piston being elongated and having a piston longitudinal axis, a piston insertion end comprising a tapered surface relative to the piston longitudinal axis, and a planar end surface extending across the piston longitudinal axis at the piston insertion end;

placing a radial canted coil spring inside the housing bore to permit latching and unlatching, said radial canted coil spring comprising a plurality of coils each comprising a major axis, a minor axis, and a wire diameter sized to cooperate with the piston and the housing;

moving the piston in a first direction relative to the housing into the housing bore to capture and bias the radial canted coil spring in a common groove defined by a piston groove of the piston and a housing groove of the housing to latch the piston to the housing; said common groove comprising two tapered surfaces, including a first tapered surface of the piston groove and a second tapered surface of the housing groove, that are tapered relative to the piston longitudinal axis and the radial canted coil spring simultaneously contacting the common groove, including the two tapered surfaces, in a latched position to create a biasing load on the radial canted coil spring between the housing bore and the piston;

wherein the tapered surface of the piston insertion end lifts the plurality of coils during insertion of the piston in the first direction into the housing bore, said movement in the first direction produces a connect force and movement of said piston in a second direction opposite the first direction so that at least one of said two tapered surfaces lifts the plurality of coils to separate said radial canted coil spring from the common groove produces a disconnect force;

wherein the radial canted coil spring is located along an axial position in the housing groove prior to latching the piston to the housing and after separating the piston from the housing or the radial canted coil spring is located along an axial position in the piston groove prior to latching the piston to the housing and after separating the piston from the housing; and wherein the first tapered surface of the piston groove is part of a V-groove of the piston groove.

26. The method of claim 25, further comprising canting the plurality of coils from a respective first canted angle in the latched position in which the plurality of coils simultaneously contact the common groove to a further canting angle in moving the piston in the second direction and then removing the piston from the housing without destroying the radial canted coil spring.

27. The connector according to claim 2, wherein the housing has a flange forming part of the housing groove.

28. The connector according to claim 13, wherein the housing has a flange forming part of the housing groove.

29. The method of claim 25, wherein the second tapered surface of the housing groove is part of a V-groove.

30. The connector according to claim 1, wherein the tapered sidewall is a first tapered surface and the piston groove comprises a second tapered surface that is tapered relative to the lengthwise axis of the piston, and wherein the radial canted coil spring contacts both the first tapered surface and the second tapered surface.

31. The method of claim 25, wherein the piston comprises a shoulder abutting a side of the housing to restrict movement of the piston in the first direction following the latched position.

32. The connector according to claim 1, wherein the piston comprises a shoulder abutting a side of the housing to restrict movement of the piston in the first direction following the latched position.

33. The connector according to claim 32, wherein the connector is an electrical connector and is configured to be subjected to an electrical current.

* * * * *